(12) United States Patent
Malta et al.

(10) Patent No.: US 12,668,279 B2
(45) Date of Patent: Jun. 30, 2026

(54) VEHICLE COLLABORATION AND SENSOR ENHANCEMENT

(71) Applicant: WAYMO LLC, Mountain View, CA (US)

(72) Inventors: Kevin Malta, San Francisco, CA (US); Craig Lewin Robinson, Santa Clara, CA (US); Julien Charles Mercay, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 93 days.

(21) Appl. No.: 18/140,267

(22) Filed: Apr. 27, 2023

(65) Prior Publication Data

US 2023/0347938 A1 Nov. 2, 2023

Related U.S. Application Data

(60) Provisional application No. 63/335,993, filed on Apr. 28, 2022.

(51) Int. Cl.
| | |
|---|---|
| *B60W 60/00* | (2020.01) |
| *G01C 21/30* | (2006.01) |
| *G01S 19/40* | (2010.01) |

(52) U.S. Cl.
CPC ....... *B60W 60/00253* (2020.02); *G01C 21/30* (2013.01); *G01S 19/40* (2013.01); (Continued)

(58) Field of Classification Search
CPC ..... B60W 60/00253; B60W 60/00256; B60W 2420/408; B60W 2556/40; (Continued)

(56) References Cited

U.S. PATENT DOCUMENTS

| | | | | |
|---|---|---|---|---|
| 5,523,763 A | * | 6/1996 | Loomis | G01S 19/41 342/357.44 |
| 8,788,193 B2 | | 7/2014 | Fauci et al. | |

(Continued)

FOREIGN PATENT DOCUMENTS

| | | | | |
|---|---|---|---|---|
| CN | 103018758 A | * | 4/2013 | |
| CN | 204631251 U | * | 9/2015 | |

(Continued)

OTHER PUBLICATIONS

"Zhu, Ni; et al.; GNSS Position Integrity in Urban Environments: A Review of Literature; Sep. 2018; IEEE Transactions on Intelligent Transportation Systems, vol. 19, No. 9" (Year: 2018).*

(Continued)

*Primary Examiner* — Ramya P Burgess
*Assistant Examiner* — Christopher R Cardimino
(74) *Attorney, Agent, or Firm* — Botos Churchill IP Law

(57) ABSTRACT

The technology provides enhanced localization approaches using vehicle-obtained information in place of or to enhance global positioning information to localize a user's position. Such information can be shared with the user's client device in real-time prior to pickup or meeting at a selected location. This can supplement or replace inaccurate localization information available at the client device, and can be done as needed when the user is within a threshold range of one or more autonomous vehicles. A client device of a user can compute its position using the vehicle positioning information. The vehicle positioning approach may be performed when the user is within a certain range of one or more vehicles. Vehicle localization information may also be used to correct the client device's localization information. Here, using hyper-accurate vehicle positioning, one or more vehicles can compute pseudorange errors for each "visible" satellite in a global positioning service.

20 Claims, 21 Drawing Sheets

(52) U.S. Cl.
CPC . *B60W 60/00256* (2020.02); *B60W 2420/408* (2024.01); *B60W 2556/40* (2020.02); *B60W 2556/45* (2020.02); *B60W 2556/50* (2020.02)

(58) Field of Classification Search
CPC .......... B60W 2556/45; B60W 2556/50; G01C 21/30; G01C 21/3438; G01S 19/40; G01S 17/89
See application file for complete search history.

(56) References Cited

U.S. PATENT DOCUMENTS

| | | | | |
|---|---|---|---|---|
| 9,058,681 | B2 | 6/2015 | Troy et al. | |
| 9,226,111 | B2 | 12/2015 | Marti et al. | |
| 9,250,080 | B2 | 2/2016 | Morrison et al. | |
| 9,805,605 | B2 * | 10/2017 | Ramanujam | G06Q 10/06 |
| 10,281,282 | B2 | 5/2019 | Trigoni et al. | |
| 11,740,364 | B1 * | 8/2023 | Kilfeather | G01S 19/00 342/352 |
| 2007/0159384 | A1 * | 7/2007 | Kangas | G01S 19/40 342/357.46 |
| 2008/0150796 | A1 * | 6/2008 | Syrjarinne | G01S 19/074 342/357.77 |
| 2010/0090888 | A1 | 4/2010 | Kangas | |
| 2011/0071755 | A1 * | 3/2011 | Ishigami | G01S 19/22 701/478.5 |
| 2012/0164969 | A1 | 6/2012 | Bhatia et al. | |
| 2013/0116908 | A1 * | 5/2013 | Oh | G05D 1/0295 701/96 |
| 2013/0332064 | A1 | 12/2013 | Funk et al. | |
| 2014/0106782 | A1 | 4/2014 | Chitre et al. | |
| 2014/0266876 | A1 * | 9/2014 | Tan | G01S 19/22 342/357.42 |
| 2018/0245927 | A1 | 8/2018 | Frish et al. | |
| 2018/0338229 | A1 * | 11/2018 | Nemec | G06Q 50/43 |
| 2019/0316929 | A1 * | 10/2019 | Shin | G05D 1/0246 |
| 2021/0019854 | A1 * | 1/2021 | Iagnemma | G06Q 50/40 |
| 2023/0044015 | A1 * | 2/2023 | Rezaei | G06Q 10/0631 |

FOREIGN PATENT DOCUMENTS

| | | | | | |
|---|---|---|---|---|---|
| JP | 2007333636 | A | * | 12/2007 | |
| KR | 20170141341 | A | * | 12/2017 | G01S 19/31 |

OTHER PUBLICATIONS

Banville, Simon , et al., "Precision GNSS For Everyone", Innovation, GPS World, 2016, pp. 42-48.
Beauregard, Stephane , "Infrastructureless Pedestrian Positioning", University of Bremen, 2009, pp. 1-148.
Cobb, H. Stewart , "GPS Pseudolites: Theory, Design, and Applications", Dissertation of Stanford University, 1997, pp. 1-166.
Diggelen, Frank Van, "End Game for Urban GNSS: Google's Use of 3D Building Models", Inside GNSS, Mar. 21, 2021, downloaded from internet<https://insidegnss.com/end-game-for-urban-gnss-googles-use-of-3d-building-models/>, Oct. 21, 2021, 19 pages.
Gan, Xingli , et al., "Indoor Positioning Technology of Beidou/GPS Pseudolites Correction PDR", 2017 International Conference on Indoor Positioning and Indoor Navigation (IPIN), Sep. 18-21, 2017, Sapporo, Japan, pp. 1-4.
Kamijo, Shunsuke , et al., "Autonomous Vehicle Technologies: Localization and Mapping", IEICE Fundamentals Review, vol. 9, No. 2,2015, pp. 131-141.
Kemppi, Paul , "Next generation satellite navigation systems", VTT Research Notes 2408, 2007, pp. 1-68.
Kuusniemi, Heidi , et al., "Utilizing pulsed pseudolites and high-sensitivity GNSS for ubiquitous outdoor/indoor satellite navigation", 978-1-4673-1954-6/12/$31.00 © 2012 IEEE, pp. 1-7.
Liu, Z. , et al., "Research Toward Wireless Internet-Based DGPS", Dept. of Geomatics Engineering, The University of Calgary, 2001, pp. 461-469.
Raquet, Captain J., "A New Approach to GPS Carrier-Phase Ambiguity Resolution Using a Reference Receiver Network", ION National Technical Meeting, 1997, pp. 1-10.
Raquet, Captain John F., "Multiple Reference GPS Receiver Multipath Mitigation Technique", Presented at ION Annual Meeting, Jun. 1996, pp. 1-10.
Wang, Chieh-Chih , et al., "Online Simultaneous Localization And Mapping with Detection And Tracking of Moving Objects: Theory and Results from a Ground Vehicle in Crowded Urban Areas", Robotics Institute, Carnegie Mellon University, 2003, pp. 1-8.
Yu, Baoguo , et al., "Multi-source fusion positioning algorithm based on pseudo-satellite for indoor narrow and long areas", ScienceDirect, Advances in Space Research 68 (2021) 4456-4469.
Zhu, Ruihui , et al., "RTK/Pseudolite/LAHDE/IMU-PDR Integrated Pedestrian Navigation System for Urban and Indoor Environments", Sensors 2020, 20, 1791; doi:10.3390/s20061791, pp. 1-21.

* cited by examiner

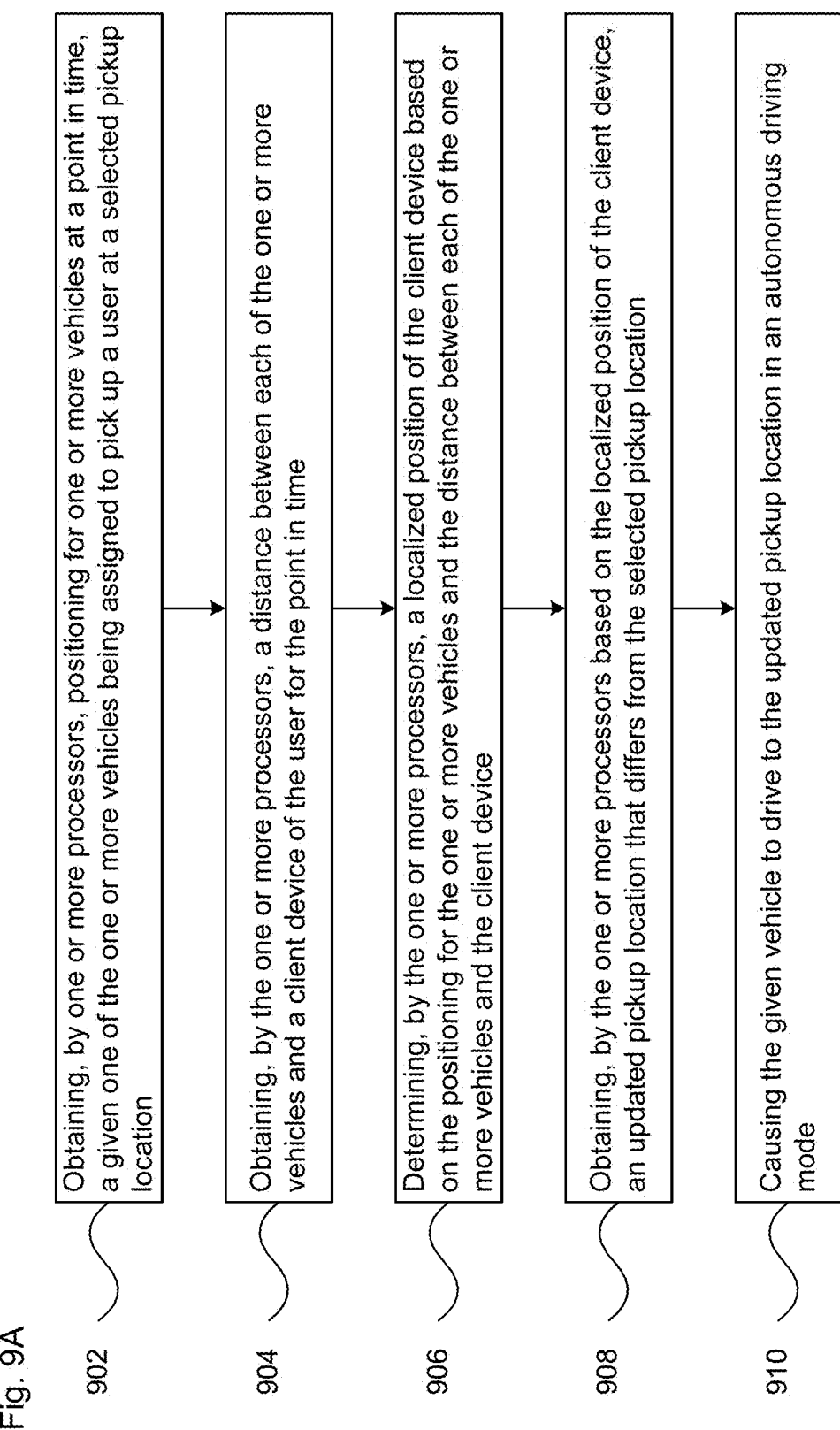

902   Obtaining, by one or more processors, positioning for one or more vehicles at a point in time, a given one of the one or more vehicles being assigned to pick up a user at a selected pickup location 904   Obtaining, by the one or more processors, a distance between each of the one or more vehicles and a client device of the user for the point in time 906   Determining, by the one or more processors, a localized position of the client device based on the positioning for the one or more vehicles and the distance between each of the one or more vehicles and the client device 908   Obtaining, by the one or more processors based on the localized position of the client device, an updated pickup location that differs from the selected pickup location 910   Causing the given vehicle to drive to the updated pickup location in an autonomous driving mode

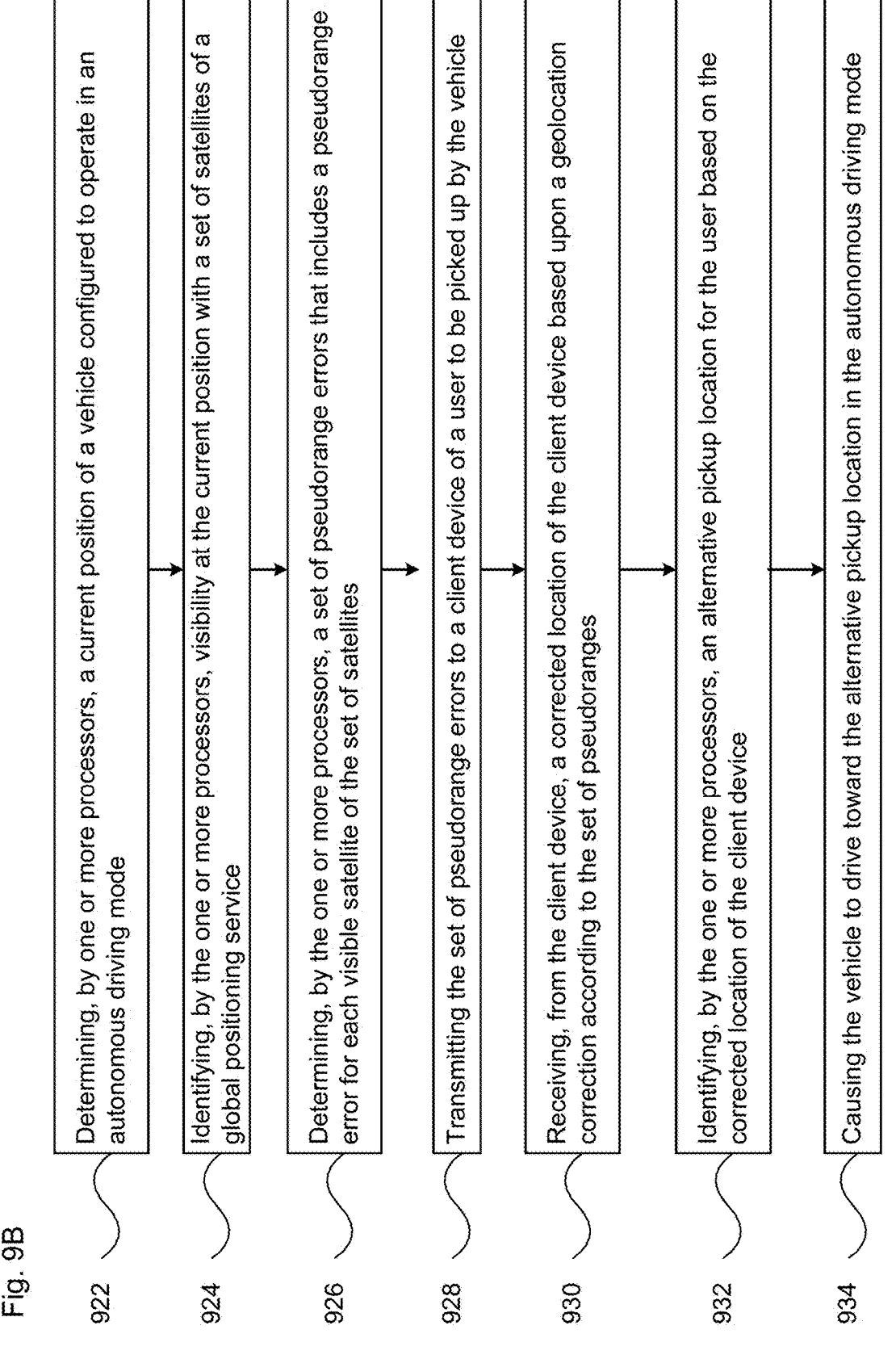

922 — Determining, by one or more processors, a current position of a vehicle configured to operate in an autonomous driving mode 924 — Identifying, by the one or more processors, visibility at the current position with a set of satellites of a global positioning service 926 — Determining, by the one or more processors, a set of pseudorange errors that includes a pseudorange error for each visible satellite of the set of satellites 928 — Transmitting the set of pseudorange errors to a client device of a user to be picked up by the vehicle 930 — Receiving, from the client device, a corrected location of the client device based upon a geolocation correction according to the set of pseudoranges 932 — Identifying, by the one or more processors, an alternative pickup location for the user based on the corrected location of the client device 934 — Causing the vehicle to drive toward the alternative pickup location in the autonomous driving mode

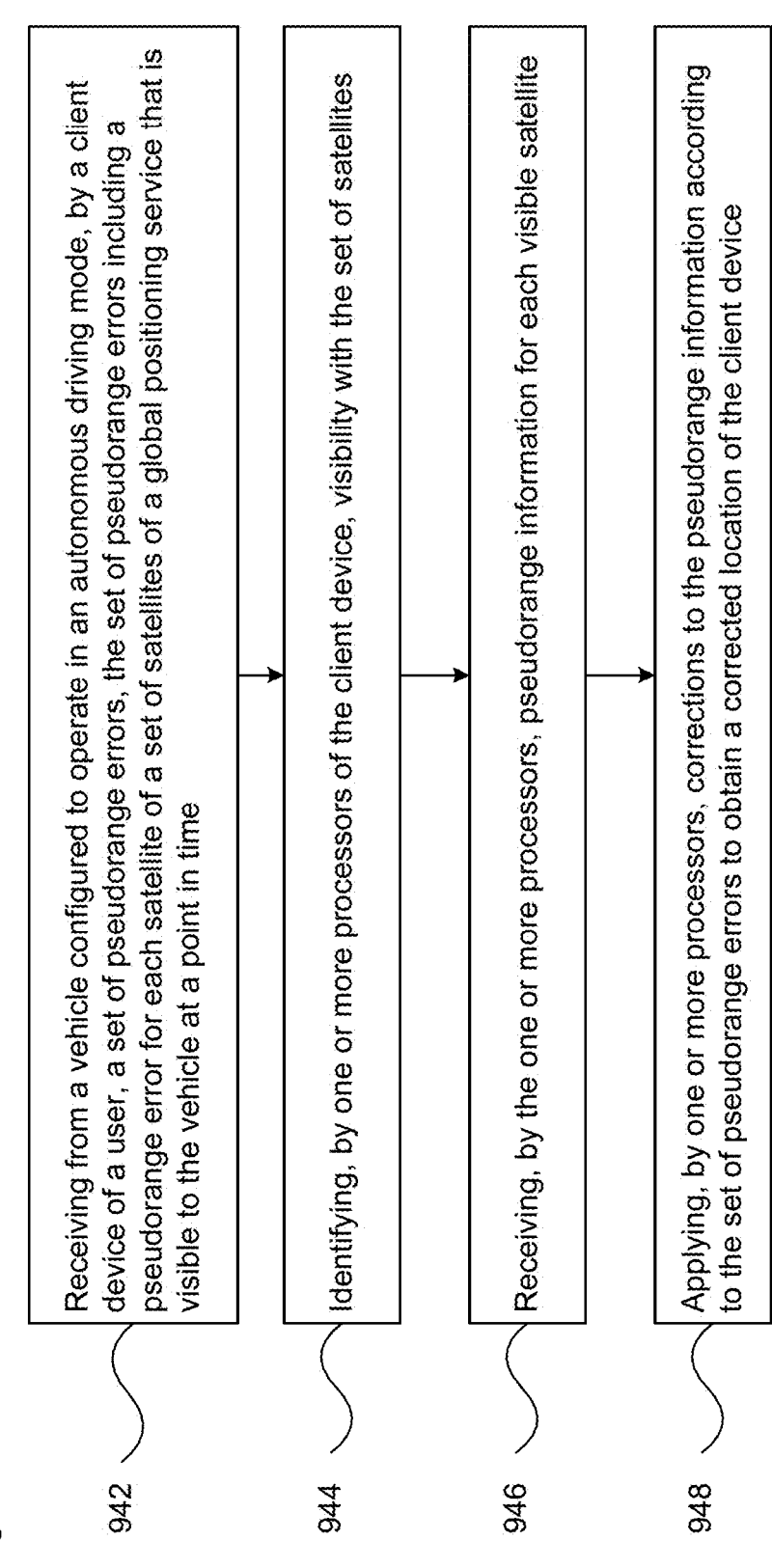

942 — Receiving from a vehicle configured to operate in an autonomous driving mode, by a client device of a user, a set of pseudorange errors, the set of pseudorange errors including a pseudorange error for each satellite of a set of satellites of a global positioning service that is visible to the vehicle at a point in time 944 — Identifying, by one or more processors of the client device, visibility with the set of satellites 946 — Receiving, by the one or more processors, pseudorange information for each visible satellite 948 — Applying, by one or more processors, corrections to the pseudorange information according to the set of pseudorange errors to obtain a corrected location of the client device

940

VEHICLE COLLABORATION AND SENSOR ENHANCEMENT

CROSS-REFERENCE TO RELATED APPLICATIONS

This application claims the benefit of and priority to U.S. Provisional Application No. 63/335,993, filed Apr. 28, 2022, the entire disclosure of which is incorporated by reference herein.

BACKGROUND

Autonomous vehicles, for instance, vehicles that may not require a human driver in certain driving situations, can be used to aid in the transport of passengers or items from one location to another. Such vehicles may operate in a fully autonomous mode where riders or other users may provide some initial input, such as selecting a pickup area or a destination, and the vehicle maneuvers itself to that area. Having accurate real-time information about the location of a rider or other user can help to refine a pickup location or a pickup time. Localization information about a user's client device, for instance based on global positioning data, can be suitably accurate in many situations. However, it can be unreliable in dense urban environments or other situations where global positioning satellites or fixed transmit beacons may not be readily detectable by the client device or otherwise suffer from interference. In such situations, the user's location may be too inaccurate to provide meaningful information about navigating to the pickup location or even pickup timing, which can adversely impact rides or deliveries by autonomous vehicles.

BRIEF SUMMARY

The technology relates to enhanced localization approaches that use vehicle-obtained information. Such information is shared with the user's client device in real-time prior to pickup or meeting at a selected location. This can supplement or replace inaccurate localization information available at the client device, and can be done as needed when the user is within a threshold range of one or more autonomous vehicles.

For instance, one or more vehicles a fleet of vehicles that are configured to operate in an autonomous driving mode can localize themselves in a highly accurate manner, such as a position within 1.0-1.5 meter of accuracy (e.g., a position in latitude, longitude, altitude coordinates). Knowing one or more vehicles' positions, a client device of a rider or other user can compute its position using the vehicle positioning information. This could replace reliance by a client device on satellite-based global positioning information or fixed terrestrial beacons, and thus can be particularly helpful in urban environments, enclosed areas such as underground or covered parking garages, tunnels, or other areas or situations that can suffer from signal blockage, multipath interference, etc. The vehicle positioning approach may be performed when the rider or other user is within a certain range of one or more vehicles. This can be efficient for both limited processing resources as well as power consumption by the user's client device.

In an alternative or additional aspect, vehicle localization information may be used to correct the client device's localization information. Here, using hyper-accurate vehicle positioning (e.g., to within 1.0-1.5 meters or less), one or more vehicles can compute pseudorange errors for each "visible" satellite in a global positioning service. This computed pseudorange error information can be communicated to a nearby client device that is within some threshold distance to the vehicle(s), which can use the information to apply its own corrections to detected global positioning signals from the satellites visible to it. As a result of these localized corrections, the client device can obtain highly reliable real-time location information.

In both types of approaches, the accurate real-time location information for the user's client device can be used by an assigned pickup vehicle and/or a back-end vehicle or fleet management system. This can be done to identify "better" pickup locations, such as places that are closer or easier to walk to from the user's current location. This can also be used in the vehicle's route or pullover planning, for instance to identify a more suitable spot to pull over in order to meet the user or to wait before the user arrives at a designated pickup location.

According to one aspect of the technology, a method comprises: obtaining, by one or more processors, positioning for one or more vehicles at a point in time, a given one of the one or more vehicles being assigned to pick up a user at a selected pickup location; obtaining, by the one or more processors, a distance between each of the one or more vehicles and a client device of the user for the point in time; determining, by the one or more processors, a localized position of the client device based on the positioning for the one or more vehicles and the distance between each of the one or more vehicles and the client device; obtaining, by the one or more processors based on the localized position of the client device, an updated pickup location that differs from the selected pickup location; and causing the given vehicle to drive to the updated pickup location in an autonomous driving mode.

The method may further comprise: determining when the client device is within a threshold distance of a first one of the one or more vehicles; wherein obtaining the positioning and obtaining the distance between each of the one or more vehicles and the client device are only performed upon determining that the client device is within the threshold distance. Alternatively or additionally, the method may further comprise: obtaining updated positioning for the one or more vehicles at another point in time; and obtaining an updated distance between each of the one or more vehicles and the client device of the user for the other point in time; wherein determining the localized position of the client device is further based on the updated positioning and the updated distance between each of the one or more vehicles and the client device.

Alternatively or additionally, the one or more vehicles may comprise at least a pair of vehicles, and determining the localized position includes performing triangulation according to the obtained positioning and the obtained distance to each of the pair of vehicles. Alternatively or additionally, the positioning for the one or more vehicles may include, for each vehicle: determining an estimated vehicle position according to one or more localization inputs; and applying a set of sensor information obtained from a set of vehicle sensors as a correction to the estimated vehicle position to obtain the positioning. The one or more localization inputs may include global positioning information. The one or more localization inputs may include lidar sensor information matched to a set of map features. The set of sensor information may also include vehicle inertial information. Moreover, applying the set of sensor information as the correction may include performing an interpolation between matches of the lidar sensor information and the set of map features.

Alternatively or additionally, the method may further comprise differentiating the given vehicle assigned to pick up the user from at least one other vehicle positioned at the updated pickup location. Alternatively or additionally to any of the above, the one or more processors may be processors of the client device, processors of the given vehicle, or processors of a computing device remote from the client device and the one or more vehicles.

According to another aspect, a method is provided that comprises: determining, by one or more processors, a current position of a vehicle configured to operate in an autonomous driving mode; identifying, by the one or more processors, visibility at the current position with a set of satellites of a global positioning service; determining, by the one or more processors, a set of pseudorange errors that includes a pseudorange error for each visible satellite of the set of satellites; transmitting the set of pseudorange errors to a client device of a user to be picked up by the vehicle; receiving, from the client device, a corrected location of the client device based upon a geolocation correction according to the set of pseudoranges; identifying, by the one or more processors, an alternative pickup location for the user based on the corrected location of the client device; and causing the vehicle to drive toward the alternative pickup location in the autonomous driving mode.

The one or more processors may be part of a computing system of the vehicle. Here, the one or more processors may be configured to store the set of pseudorange errors in memory of the computing system of the vehicle. Alternatively or additionally, the one or more processors may be configured to update the set of pseudorange errors as the vehicle travels to pick up the user.

According to a further aspect, another method comprises: receiving from a vehicle configured to operate in an autonomous driving mode, by a client device of a user, a set of pseudorange errors, the set of pseudorange errors including a pseudorange error for each satellite of a set of satellites of a global positioning service that is visible to the vehicle at a point in time; identifying, by one or more processors of the client device, visibility with the set of satellites; receiving, by the one or more processors, pseudorange information for each visible satellite; and applying, by one or more processors, corrections to the pseudorange information according to the set of pseudorange errors to obtain a corrected location of the client device.

The method may further comprise: transmitting the corrected location to the vehicle; receiving, from the vehicle, a pickup location update; and generating, for presentation to the user, an indication of the pickup location update. Alternatively or additionally, applying the corrections may include discarding any pseudorange errors from the set for any satellites not currently visible to the client device. Alternatively or additionally, applying the corrections may include: comparing timestamps of the pseudorange errors with timestamps of the received pseudorange information to match timestamps occurring within a selected time window; and applying the corrections according to any matched timestamps.

BRIEF DESCRIPTION OF THE DRAWINGS

FIGS. 9A-C Illustrate example methods in accordance with aspects of the technology.

DETAILED DESCRIPTION

Many types of client devices, such as mobile phones, smartwatches, etc., use global positioning via a global navigation satellite systems (GNSS), such as the GPS system that uses RF signals broadcast by a set of satellites, to localize themselves. Riders and other users can use their client devices to schedule rides or package deliveries by an autonomous vehicle, which can include identifying a pickup location and/or a pickup time. Unfortunately, GPS or other global positioning approaches can have low accuracy or may not be available at all in certain situations. This can include urban environments or locations where the pickup area is covered or is underground, or where there are a number of skyscrapers (an urban canyon) which can reduce the "visibility" of overhead satellites. In addition, there may be a high density of vehicles, such as during rush hour, or at the beginning or end of a concert, sporting event or the like, which can make it challenging to determine which vehicle is there for which rider or other customer. For instance, there may be a handful or more of similar vehicles, which may be part of a fleet of vehicles, that are within 50-100 meters of one another. If each vehicle is only locatable to within 25-50 meters, there is a strong possibility that the wrong vehicle may be identified as the one scheduled to pick up a customer. These types of issues can be addressed by enabling client devices to compute their real-time position using one or autonomous vehicles as references and/or using such vehicles to provide location correction information to the client devices.

Example Vehicle Systems

Figure 1A:
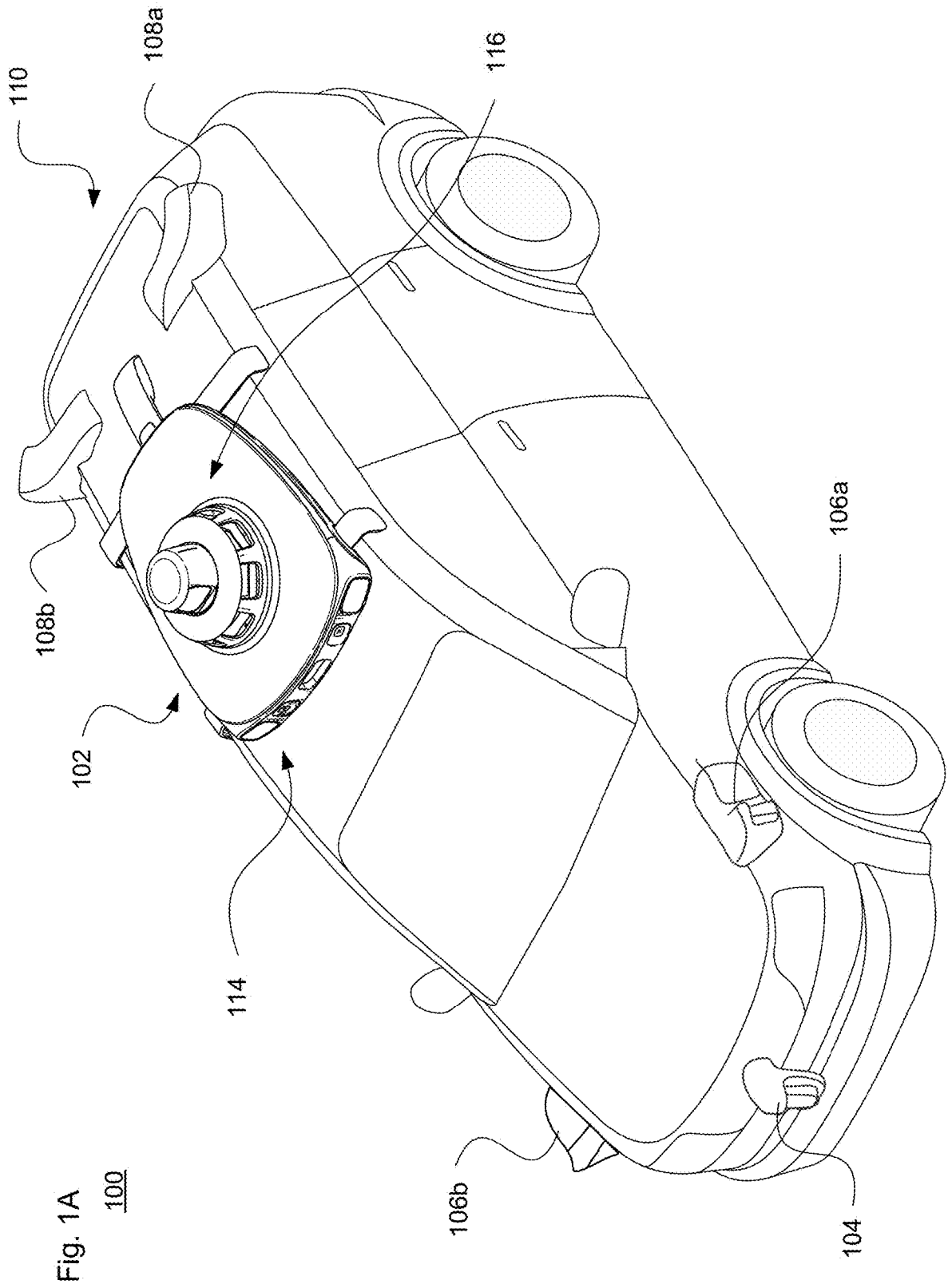
FIGS. 1A-B illustrate example autonomous vehicles in accordance with aspects of the technology.
Figure 1B:
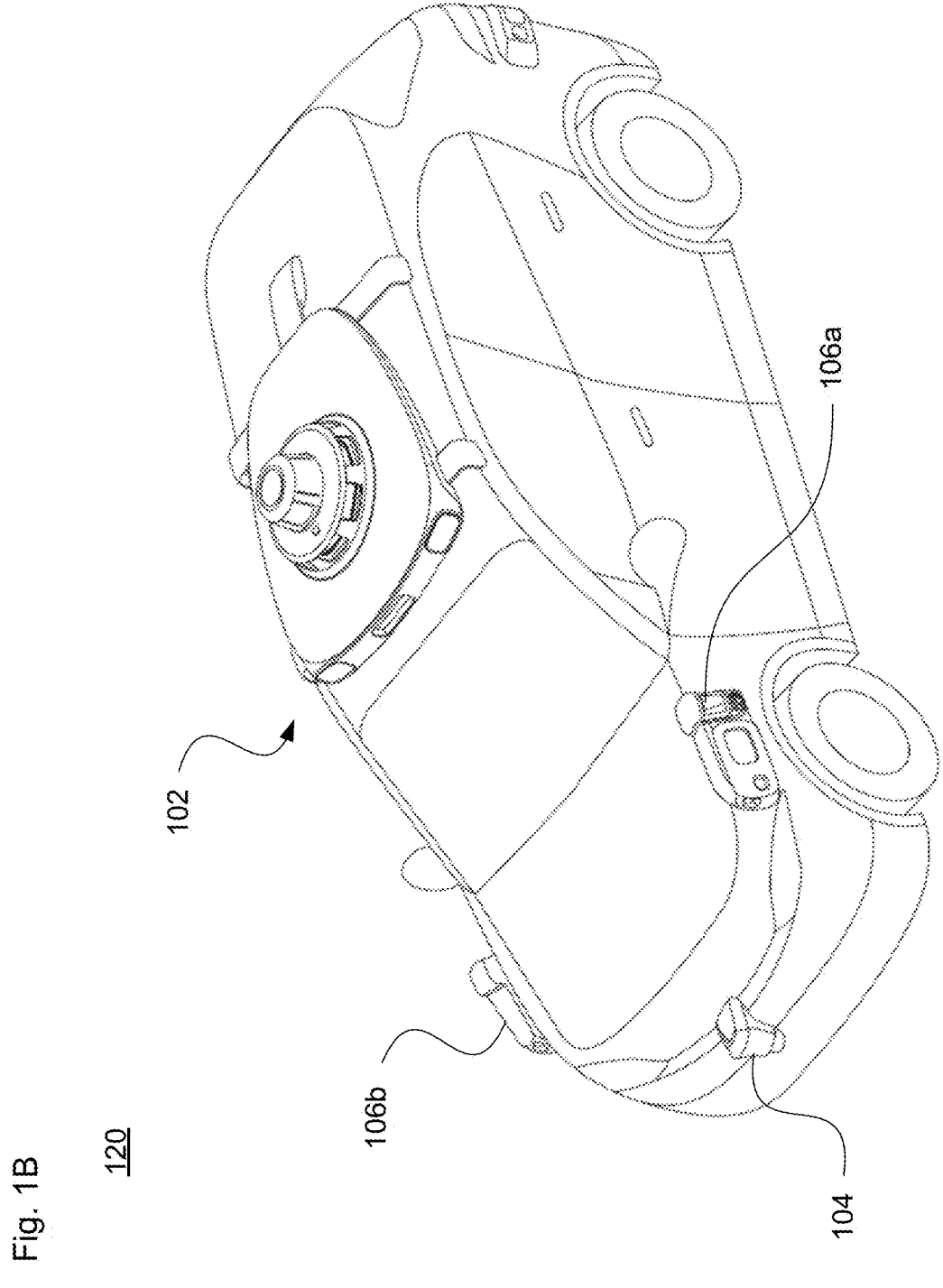
Figure 1C:
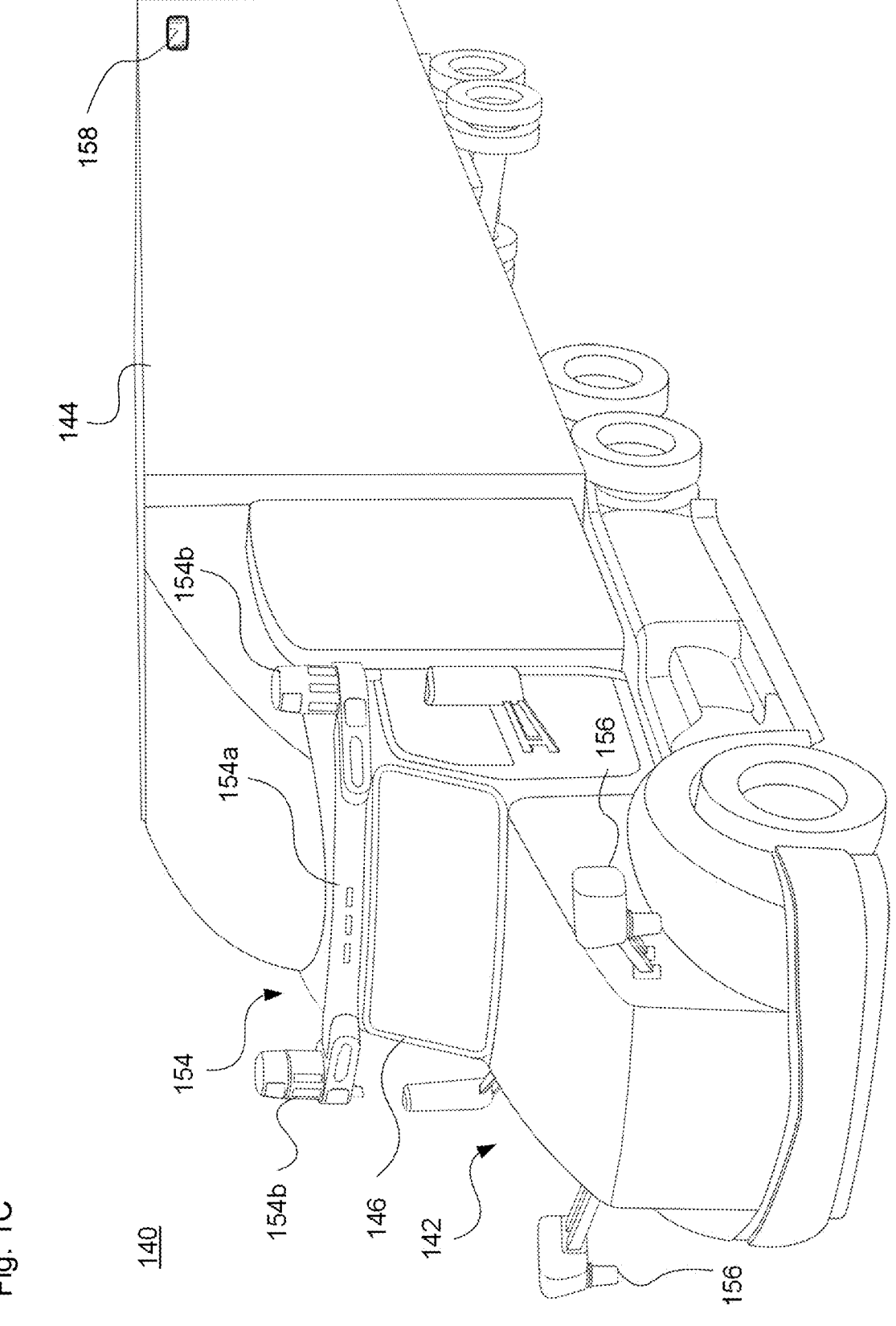
FIGS. 1C-E illustrate example cargo and delivery type vehicles configured for use with aspects of the technology.
Figure 1D:
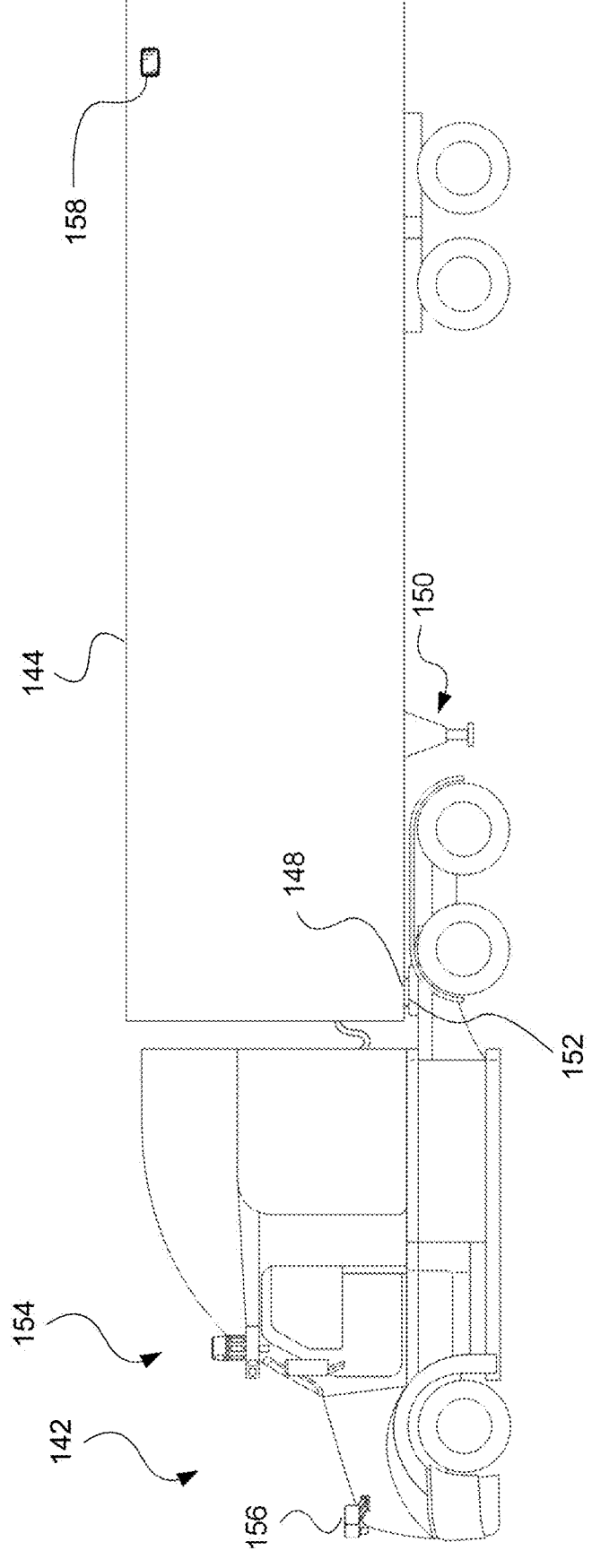
Figure 1E:
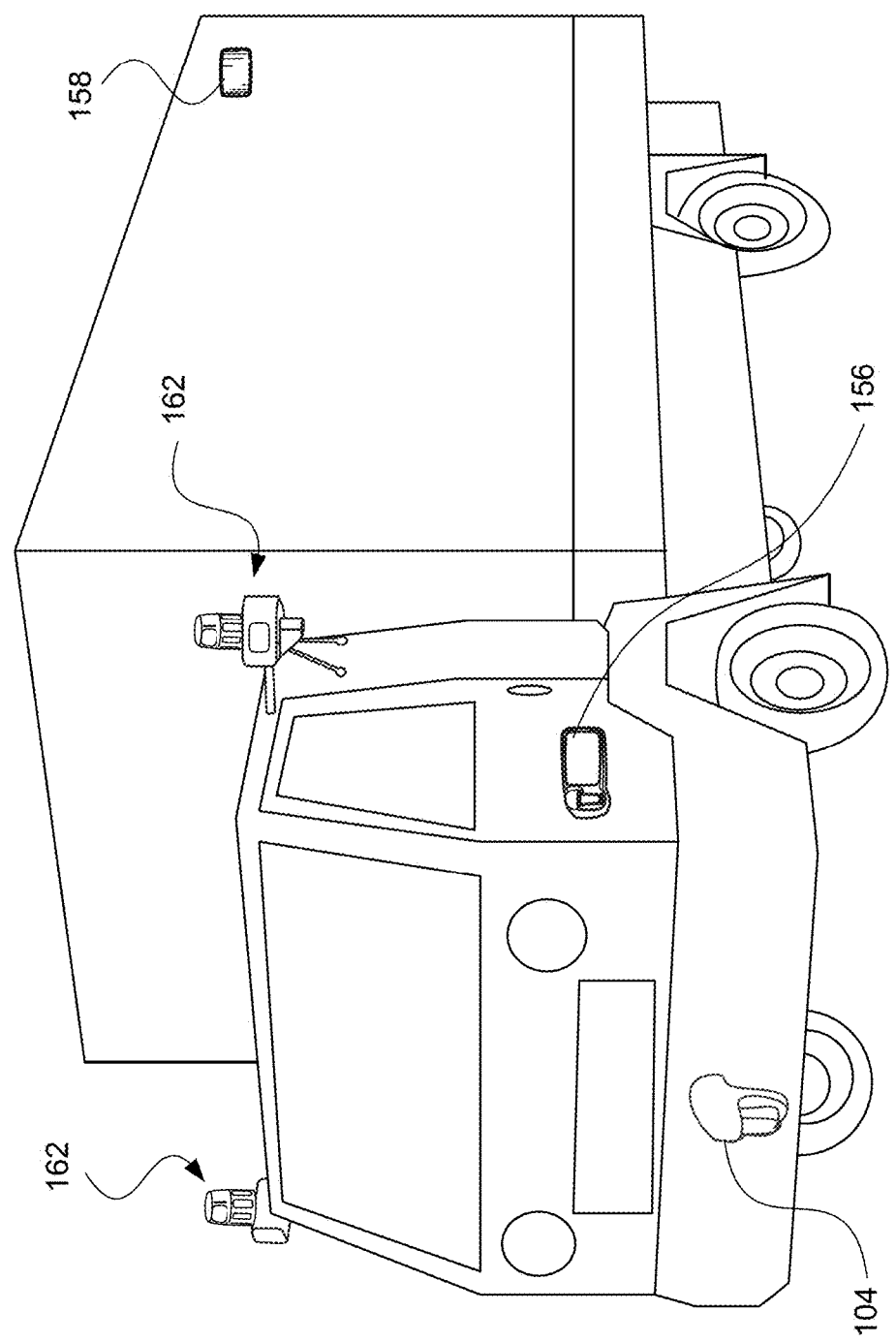

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries. Each of these types of vehicles can be used in accordance with the technology described herein Vehicles, such as those discussed below, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified autonomy different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of vehicle including, but not limited to, cars, vans, motorcycles, cargo vehicles, buses, recreational vehicles, emergency vehicles, etc.

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100.

For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck. The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 154 may also have one or more sensor units 158 disposed therealong, for instance along one or both side panels, front, rear, roof and/or undercarriage of the trailer 154.

The perspective view 160 of FIG. 1E illustrates an example panel truck or other vehicle that may be suitable for local deliveries (e.g., groceries, meals, mail or other packages, etc.). Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
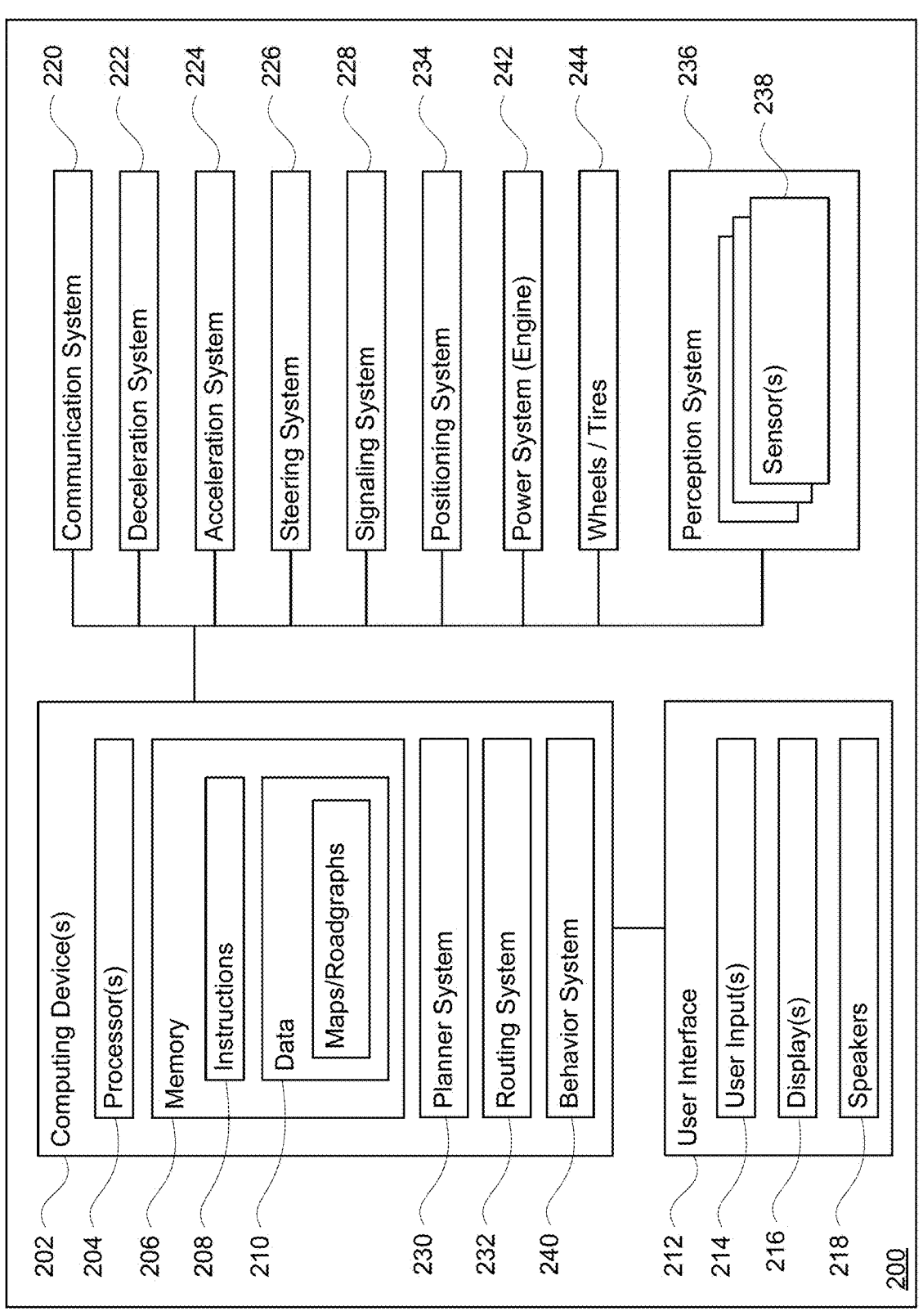
FIG. 2 illustrates components of a autonomous vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless connections may include one or more short range communication protocols such as Bluetooth, Bluetooth low energy (LE), ultra-wideband (UWB), longer range cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system

228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, bicycle lanes, speed limits, traffic signals, buildings, signs, real time traffic information (updated as received from a remote computing device, as such as the computing devices discussed below or other computing devices), pullover spots such as stopping or loading zones, vegetation, or other such objects and information. The map information may also include details about features adjacent to a roadway, such as curbs with or without ramps, as well as traffic or safety barriers, fences, etc.

The map information may be derived from satellite imagery and/or may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing device(s) 202 in order to determine the vehicle's relative or absolute position on a map or on the earth. For example, the positioning system 234 may include a GPS receiver to determine the device's latitude, longitude and/or altitude position based on information from "visible" satellites. By way of example, GPS utilizes at least 24 operational satellites in 6 orbital planes around the Earth. At any given location, at least 4 satellites may be in locations that can be detected by the GPS receiver. However, one or more of the satellites may not be visible to a given client device, for instance due to tall buildings (e.g., one or more skyscrapers), an underground roadway such as a tunnel, or other structures (e.g., an indoor or below ground parking garage) that may block or otherwise interfere with the RF signals transmitted by the satellites. Fewer visible satellites translates into a reduction in GPS accuracy, or the client device being able to determine its location at all. In some situations, the reduced accuracy could result in a location estimate that is off by tens or meters or more.

Other location systems such as laser-based localization systems, inertial-aided GPS, or camera-based localization may also be used to identify the location of the vehicle. The location of the vehicle may include information about an absolute geographical location (such as latitude, longitude, and altitude), a location of a node or edge of a roadgraph, as well as relative location information (such as location relative to other road users immediately around the vehicle), which can often be determined with less noise than an absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 202, other computing devices and combinations of the foregoing. By way of example, the computing device 202 may apply a filter that combines all the information from "vehicle frame" sensors such as wheels speeds, radar, laser scan matching and an inertial measurement unit (IMU) having one or more accelerometers and/or gyroscopes. In one aspect, the system may match the vehicle position to an existing map using the laser scans. In another aspect, this filter approach can limit how much the vehicle will drift when the system does not have a laser scan match to map. In addition, when the GPS information is accurate enough (e.g., to within 1-2 meters, or more or less) the system may also use that information to improve the accuracy. Thus, piece of information may be combined to create an enhanced localization of the vehicle.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other convenient locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236, positioning system 234 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings at particular points in time (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system and/or a pedestrian detection system configured to detect emergency vehicles and pedestrians from sensor data generated by sensors of the vehicle. Each of these detection system software modules may use various models to output a likelihood of a construction zone or an object being an emergency vehicle, a pedestrian or other type of object.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
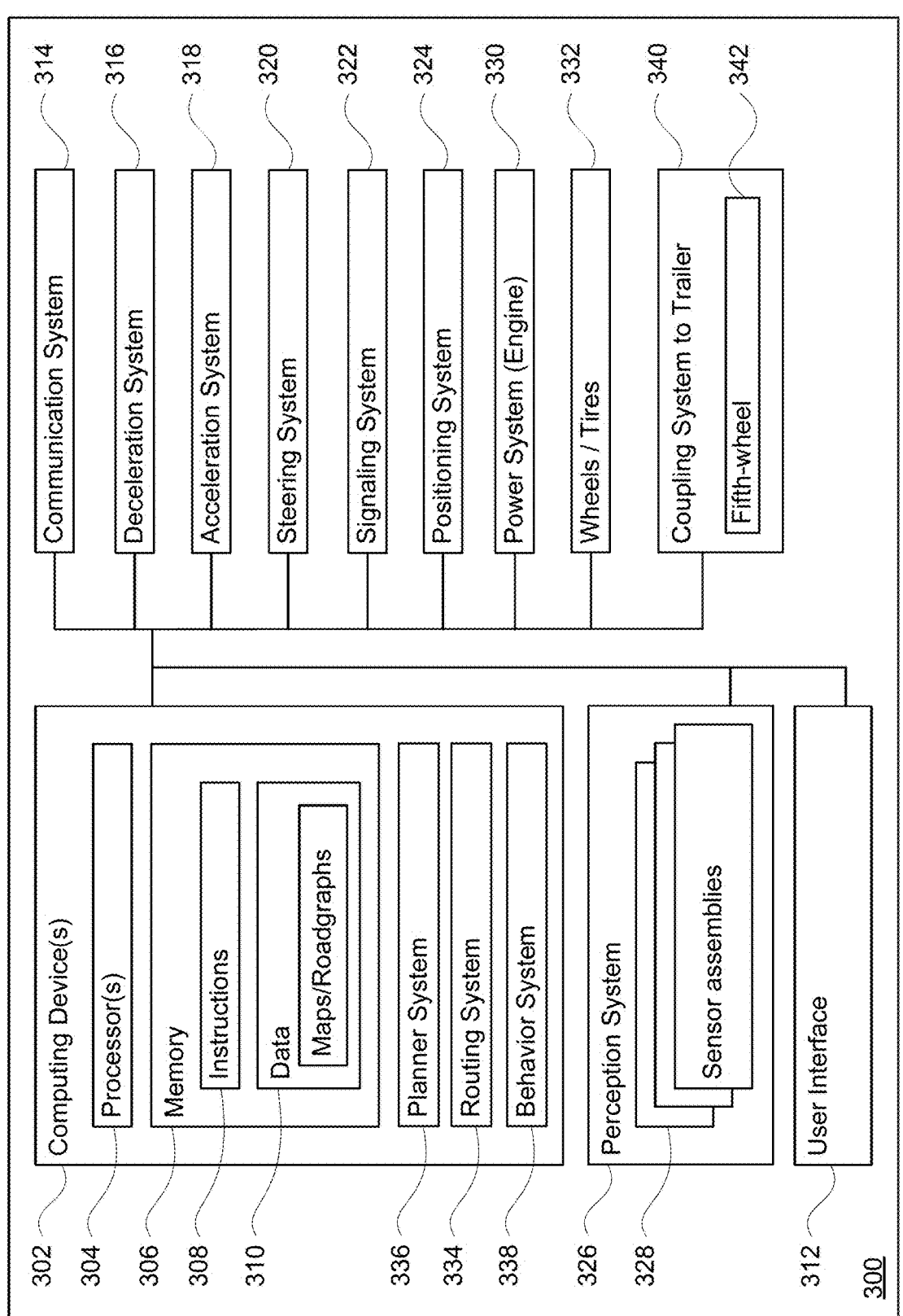
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information, e.g., roadgraphs.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding equivalent elements in FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
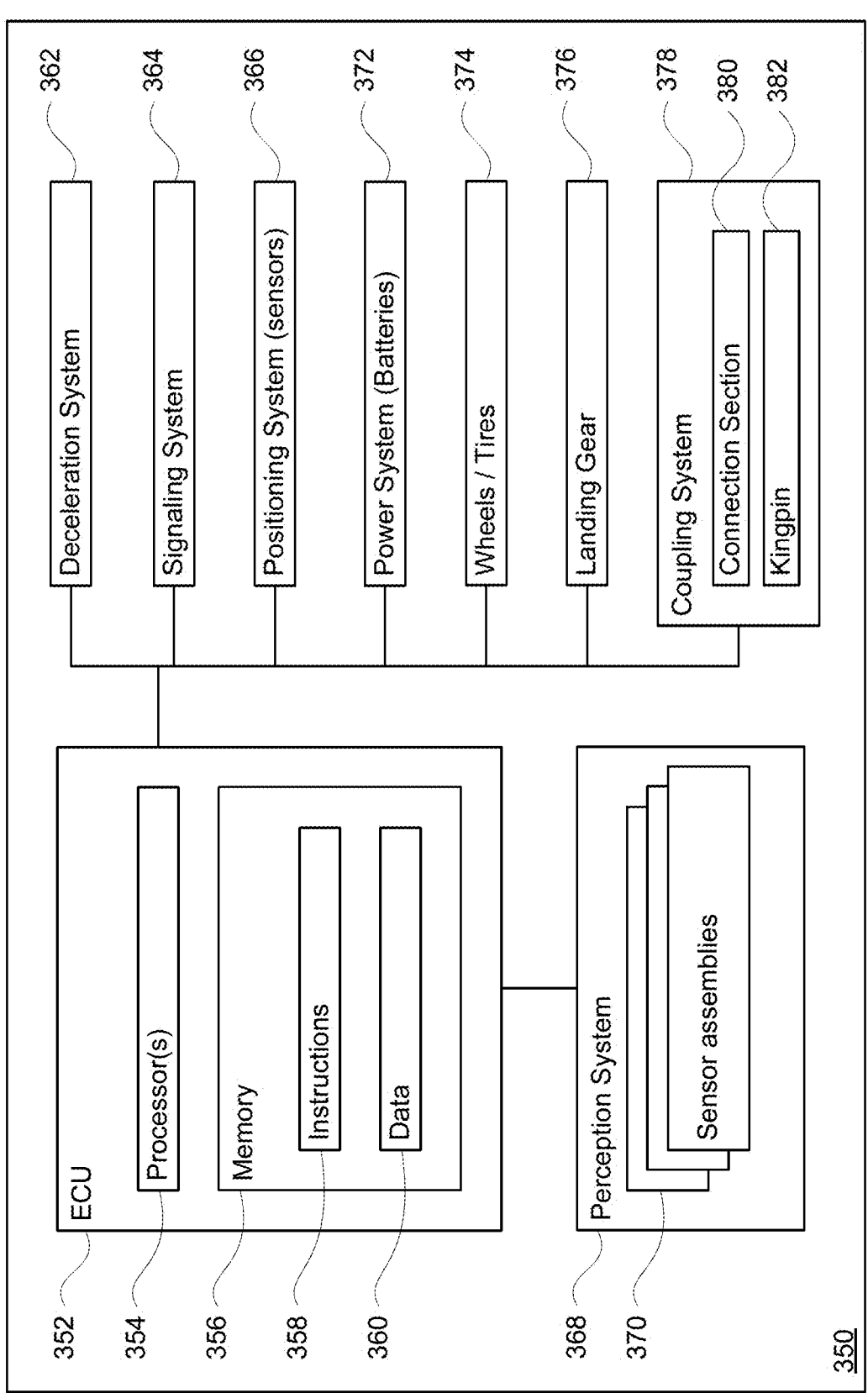

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations

Figure 4:
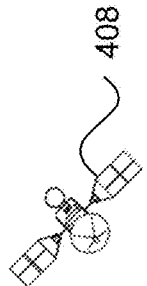
FIG. 4 illustrates a pickup situation in accordance with aspects of the technology.

FIG. 4 illustrates an example pickup situation 400. As shown by the dashed arrows, a pedestrian 402 and an autonomous vehicle 404 are heading toward a pickup location 406. In this example, the pedestrian's client device (not shown) is using GPS signals from a set of GPS satellites 408. As illustrated, only two GPS satellites 408 may be currently visible to the client device. This may be due to tall buildings, bridges or overpasses, heavy foliage or other obstructions. Based on the limited satellite information available, the pedestrian's estimated location based on GPS signals may vary from the actual location by tens or hundreds of meters, as indicated by dotted oval uncertainty region 410. Thus, as shown in this example, the client device may estimate the pedestrian 402 to be at location 412, which is within the uncertainty region 410 but remote from the pedestrian's actual location 414.

If the client device were to have a more accurate position for the pedestrian that it could share with the vehicle 404 or with a back-end route scheduling or fleet management system, then either the vehicle or back-end system could suggest updating the pickup location from location 406 to a different location 416 that is closer in time and/or distance for the pedestrian, or is otherwise more suitable. However, because the estimated location indicates that the pedestrian is at location 412 rather than at the actual location 414, the original pickup location 406 is not changed. This may require a longer or more difficult walk for the pedestrian, and the autonomous vehicle may need to either idle in a spot nearby the original pickup location or circle around the block while waiting for the pedestrian to arrive.

Vehicle-Based Localization Signals

Figure 5A:
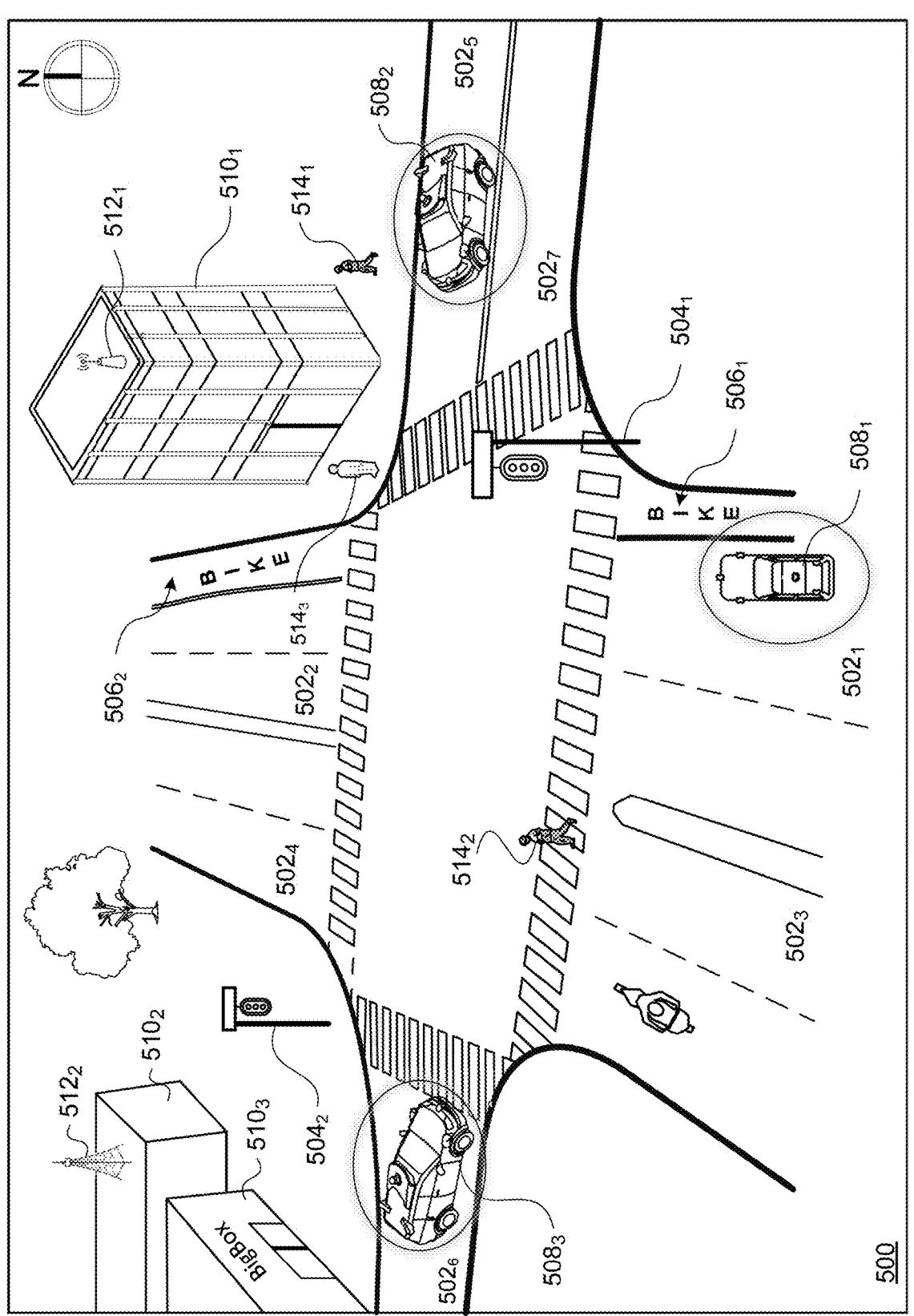
FIGS. 5A-B illustrate vehicle-based localization in accordance with aspects of the technology
Figure 5B:
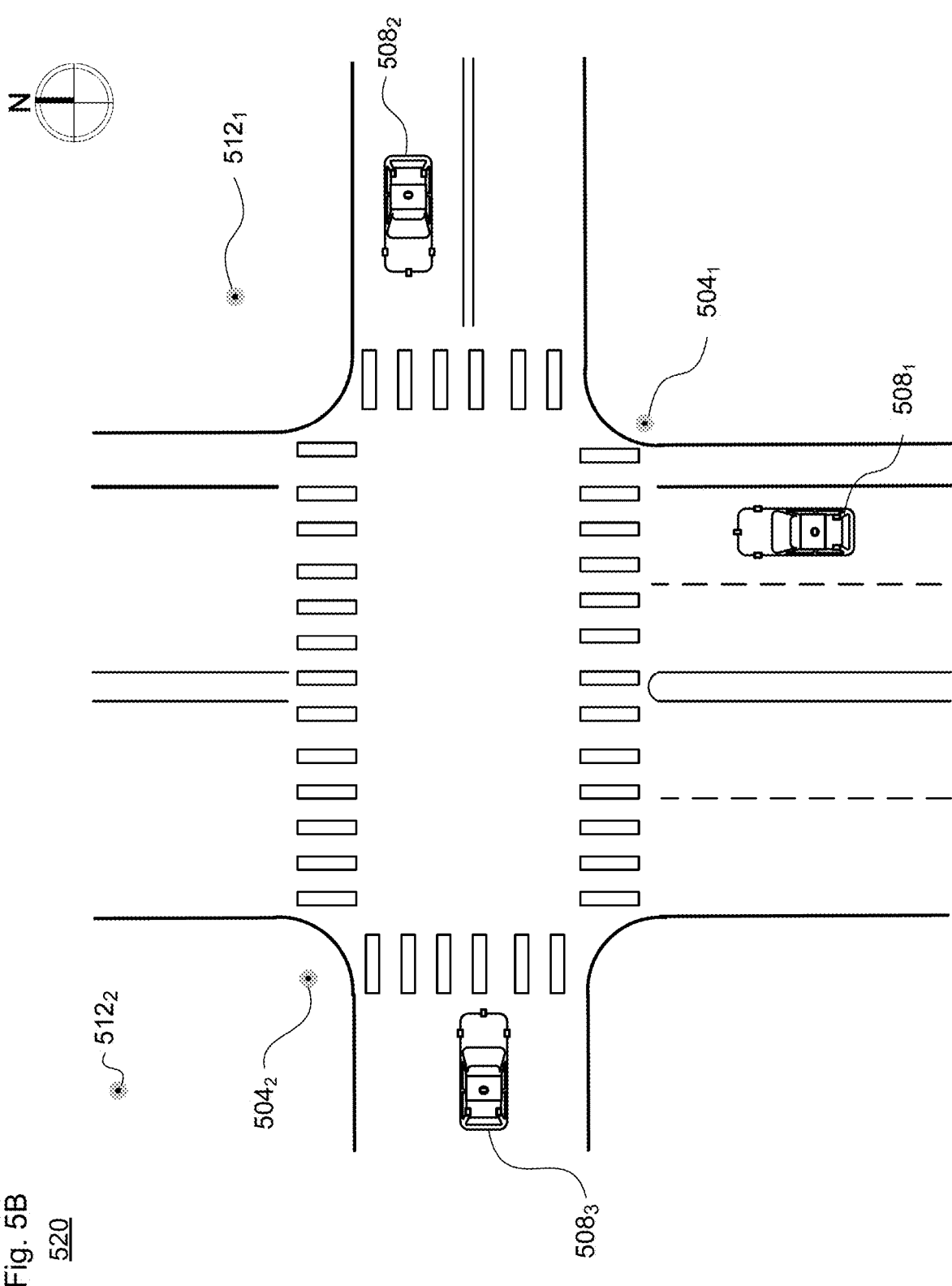

FIGS. 5A-B illustrate an example for employing vehicle-based localization signals in accordance with aspects of the technology. View 500 of FIG. 5A presents a perspective view of a four-way intersection in an urban setting. View 520 of FIG. 5B is a top-down view illustrating certain features in the scene. The intersection includes a number of northbound road segments $502_1$ and $502_2$, a number of southbound road segments $502_3$ and $502_4$, a westbound road segment $502_5$, and eastbound road segments $502_6$ and $502_7$. Some of the road segments, such as $502_1$-$502_4$, may have multiple lanes (which may be separately identified in road-graph data). A pair of traffic lights $504_1$ and $504_2$ are shown on opposite corners of the intersection. Bike lane segments $506_1$ and $506_2$ are disposed adjacent to road segments $502_1$ and $502_2$, respectively. Information about these and other roadway features, such as curb placement, may be part of a detailed map (e.g., a roadgraph), and the detailed map can be used by autonomous vehicles $508_1$, $508_2$ and $508_3$. Information about the locations of other objects, such as buildings $510_1$, $510_2$ and $510_3$, may be stored in the same or a different detailed map. In this example, building $510_1$ may have a fixed WiFi access point $512_1$, and building $510_2$ may have a WiFi or other communication access point $512_2$.

RF or other signals from the access points 512 may be detectable by the vehicles 508, e.g., via a communication system such as system 220 of FIG. 2. Some or all of the road segments 502, the traffic lights 504 and/or the bike lane segments 506, can be detected by one or more sensors of each autonomous vehicle's perception system, such as system 236 of FIG. 2. By way of example, a given vehicle's (e.g., vehicle $508_1$) processing system may use point cloud data from one or more lidar sensors, imagery from one or more camera sensors and/or radar returns from one or more radar sensors to determine roadway features as well as to detect and identify other road users (e.g., the other autonomous vehicles $508_2$ and $508_3$), pedestrians $514_1$, $514_2$ and $514_3$ and other nearby objects in the vicinity of vehicle.

Certain detected information about the roadway, fixed objects (e.g., the traffic lights or the store name on store $510_3$, and/or the access points 512 can be used to identify the instantaneous location of the autonomous vehicles 508. As noted above, inertial information and other information may be applied to a filter to localize the vehicle. By way of example, an onboard IMU having a set of accelerometers and gyroscopes produces inertial information that is one input to the filter. A localizer module of the vehicle's onboard computing system may take received sensor (e.g., laser) scans from one or more onboard (lidar) sensors and match those scans to a map (e.g., a roadgraph) to localize the vehicle. The filter uses the inertial input along with other information such as radar data, speedometer readings, wheel speeds, laser-based localization from the localizer module, GPS location information and/or other sensor information such as from the perception system to compute vehicle position, velocity and orientation. For instance, the inertial information from the onboard IMU can be used to determine how the vehicle accelerates and brakes. This can then be used to determine how fast and in what direction the vehicle is pointed. The localization information can be used to correct an estimated vehicle position. For example, the inertial information can be used to refine this vehicle position in relation to the map of the area, e.g., by the system interpolating and smoothing the results between matches of the lidar returns and the map data.

Figure 6A:
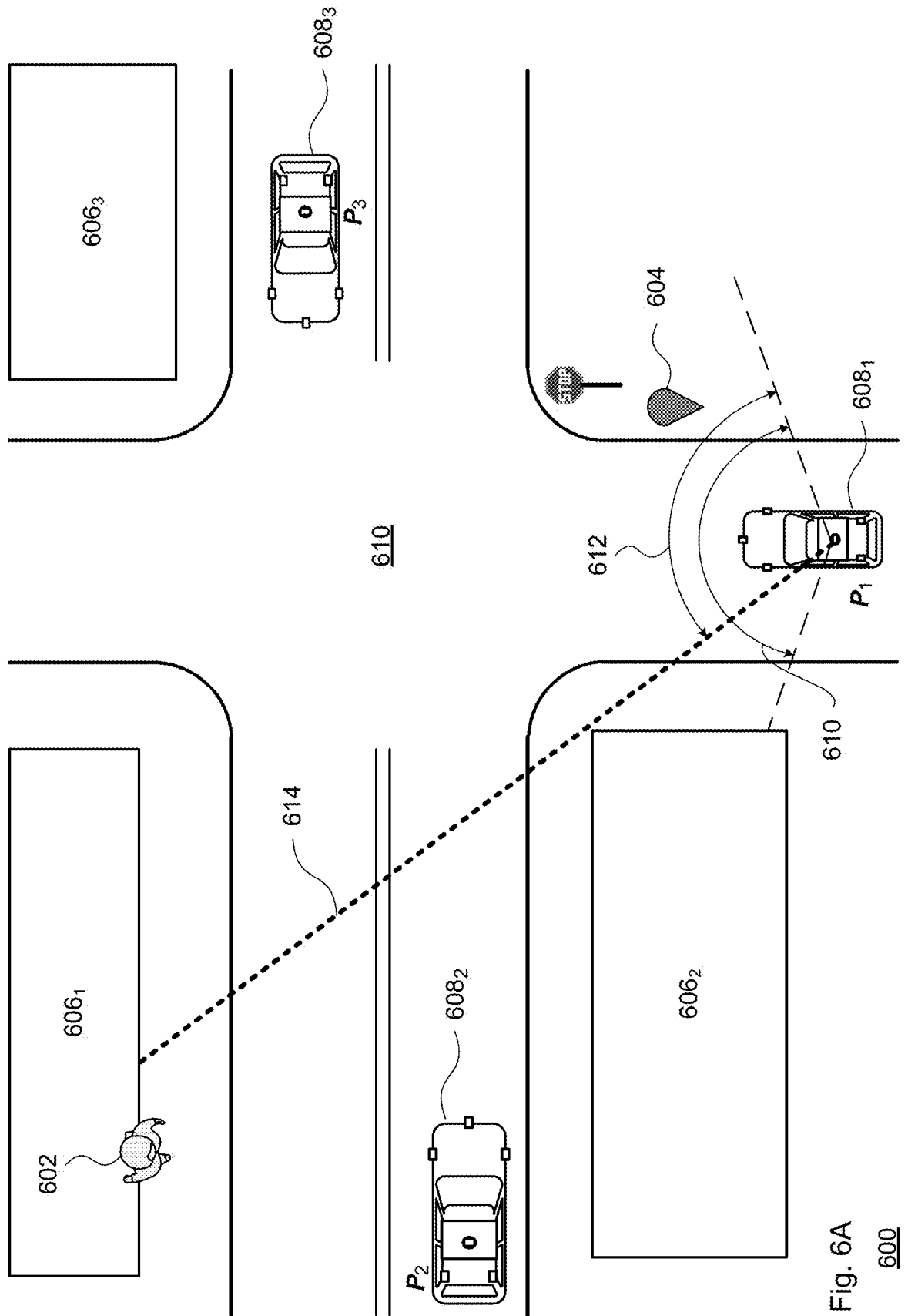
FIGS. 6A-D illustrate an example vehicle-based localization approach in accordance with aspects of the technology

FIG. 6A illustrates a scene 600, in which a pedestrian 602 has a scheduled pickup at location 604. In this scene, building $606_1$, $606_2$ and $606_3$ may be many stories tall, which interfere with GPS localization by the pedestrian's client device (not shown). A number of autonomous vehicles $608_1$, $608_2$ and $608_3$ are in the vicinity of intersection 610, with vehicle $608_1$ being closest to the pickup location 604 at the time when the pedestrian 602 exits building $606_1$. As shown, vehicle $608_1$ may have a sensor mounted on its roof (e.g., a lidar or camera sensor), which has a forward-facing field of view (FOV) 610. However, due to building $606_2$, the sensor's FOV may be limited to FOV 612 as shown by the dotted line 614. Each autonomous vehicle is associated with an instantaneous position, designated as $P_1$, $P_2$ and $P_3$, respectively. Each instantaneous position may be associated with a specific latitude, longitude and altitude set of coordinates, or other location designation. The instantaneous positions may be determined as discussed above, which may utilize multiple different bases to calculate the vehicle position.

Figure 6B:
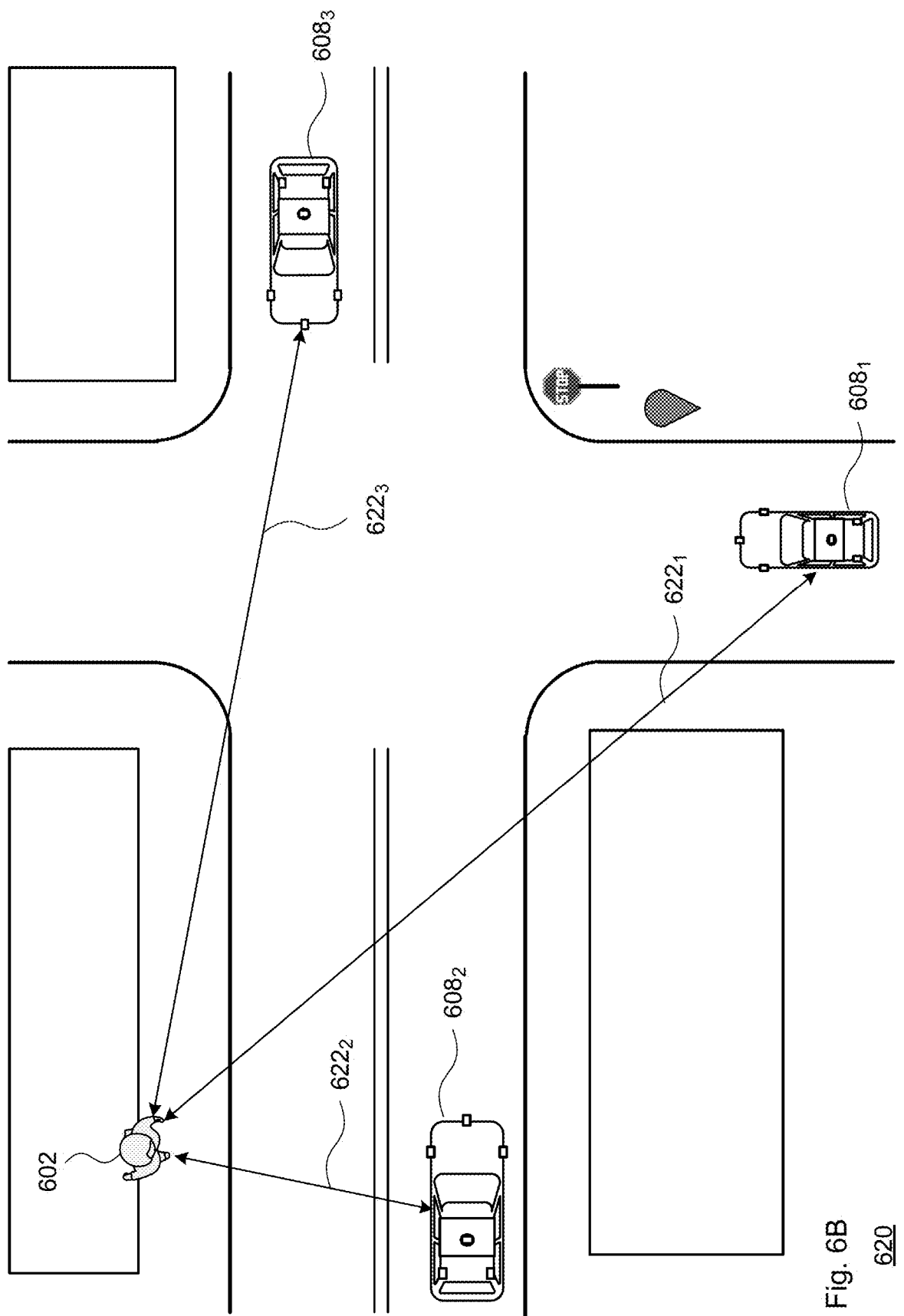

FIG. 6B illustrates view 620, which shows the pedestrian 602 and the vehicles 608. According to one aspect, an estimated distance may be determined between the pedestrian's client device and one or more of the vehicles 608. For instance, short-range RF signals, which may be Bluetooth, Bluetooth LE and/or UWB signals, may be employed. By way of example, the client device of the pedestrian may detect such signals associated with the vehicles. Alternatively or additionally, a back-end fleet management server may identify signals received by vehicles 608 and that are associated with the pedestrian's client device (e.g., as may be indicated in a ride service account associated with the pedestrian).

Since such short-range RF signals may be on the order of tens of meters or a hundred meters, an approximate distance $622_1$, $622_2$, $622_3$ can be identified between each respective autonomous vehicle and the client device. The accuracy of the approximate distance may vary depending on the type of signal. As an example, a UWB approach, which uses the timing of pulses of RF signals (e.g., according to time-of-flight) to identify the distance, may be accurate to within 10 cm. Bluetooth or Bluetooth LE may provide an accuracy to within 5 meters or less. If the distance information is obtained by the back-end system, it is transmitted to the pedestrian's client device (e.g., via a signal directly from one of the vehicles or from a cellular communication connection).

In one scenario, the collected position (and distance) information may only be sent to the client device when a threshold condition is met, in order to avoid the client device from unnecessarily using processing, transceiver or memory resources. For instance, upon detection of a Bluetooth or Bluetooth LE signal associated with the client device, the vehicle(s) or the back end system may request initiation of a UWB process to obtain highly accurate distance information. Thus, a UWB transceiver module of the client device would only be utilized for localization when the client device is relatively near to the vehicle(s), e.g., within 50-250 meters (or more or less).

Figure 6C:
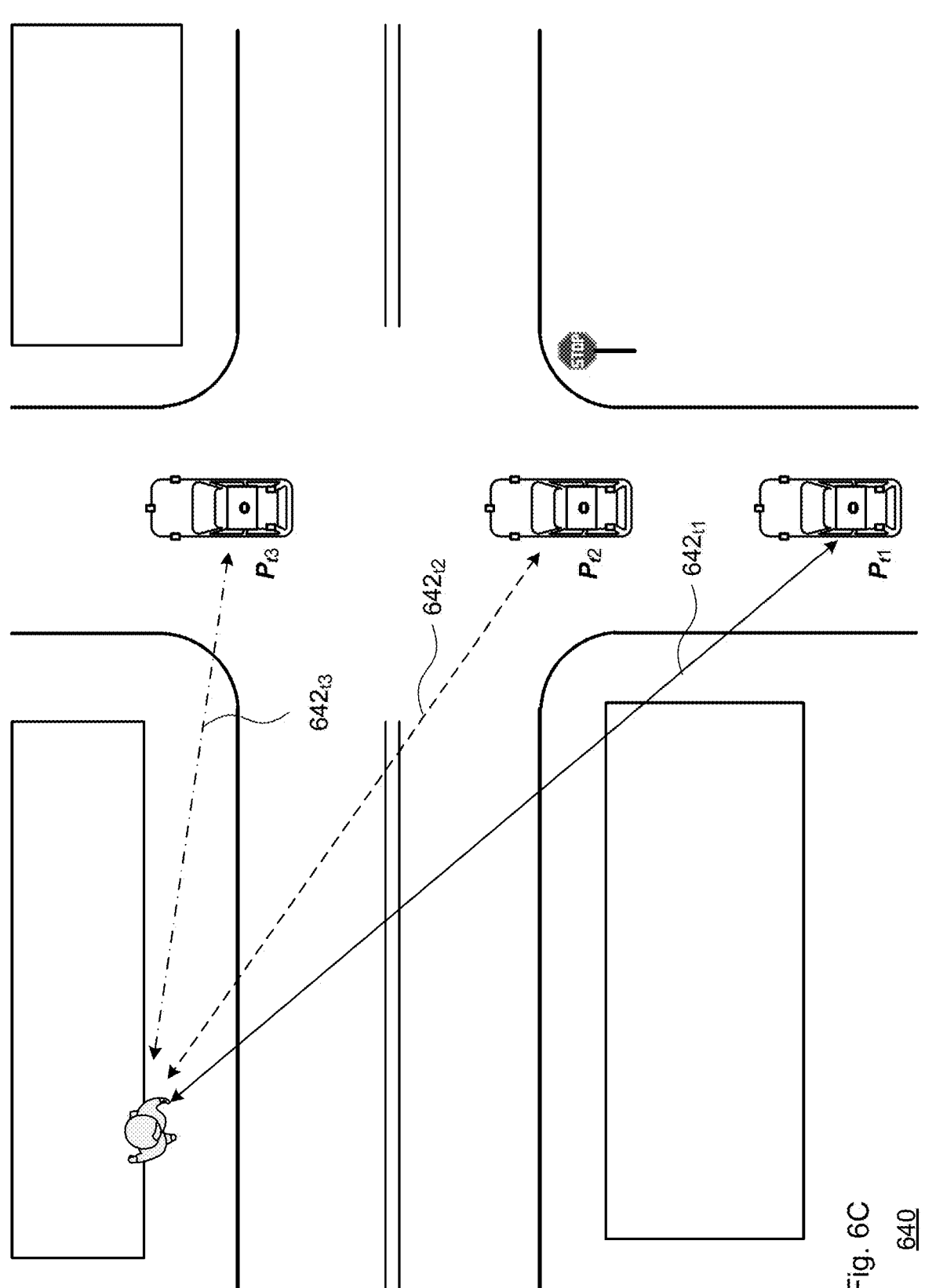

In addition to the distance information, the instantaneous position information for each vehicle is also transmitted to the client device. This may be done a single time, or may be repeated multiple times over a few seconds or more. Using the distance and position information associated with multiple vehicles, the client device then attempts to triangulate its position. The more information available from as many autonomous vehicles as possible, the better. Thus, any autonomous vehicle in the vicinity of the pedestrian can potentially be used to help localize the pedestrian via their client device. And as shown in view 640 of FIG. 6C, position (e.g., $P_{r1}$, $P_{r2}$, $P_{r3}$) and distance (642$_{r1}$, 642$_{r2}$, 642$_{r3}$) from a single autonomous vehicle at different points in time (e.g., $t_1$, $t_2$, $t_3$) can be used in the triangulation calculations. Because the autonomous vehicles are mobile (e.g., except when parked for a pickup or drop-off situation), different vehicles may be within detection range of the pedestrian at different points in time. This dynamic approach can avoid issues that may arise with fixed ground stations that provide beacon or reference signals, which may suffer from signal blockage or other interference like the GPS satellites, depending on where the pedestrian's client device is currently located.

Figure 6D:
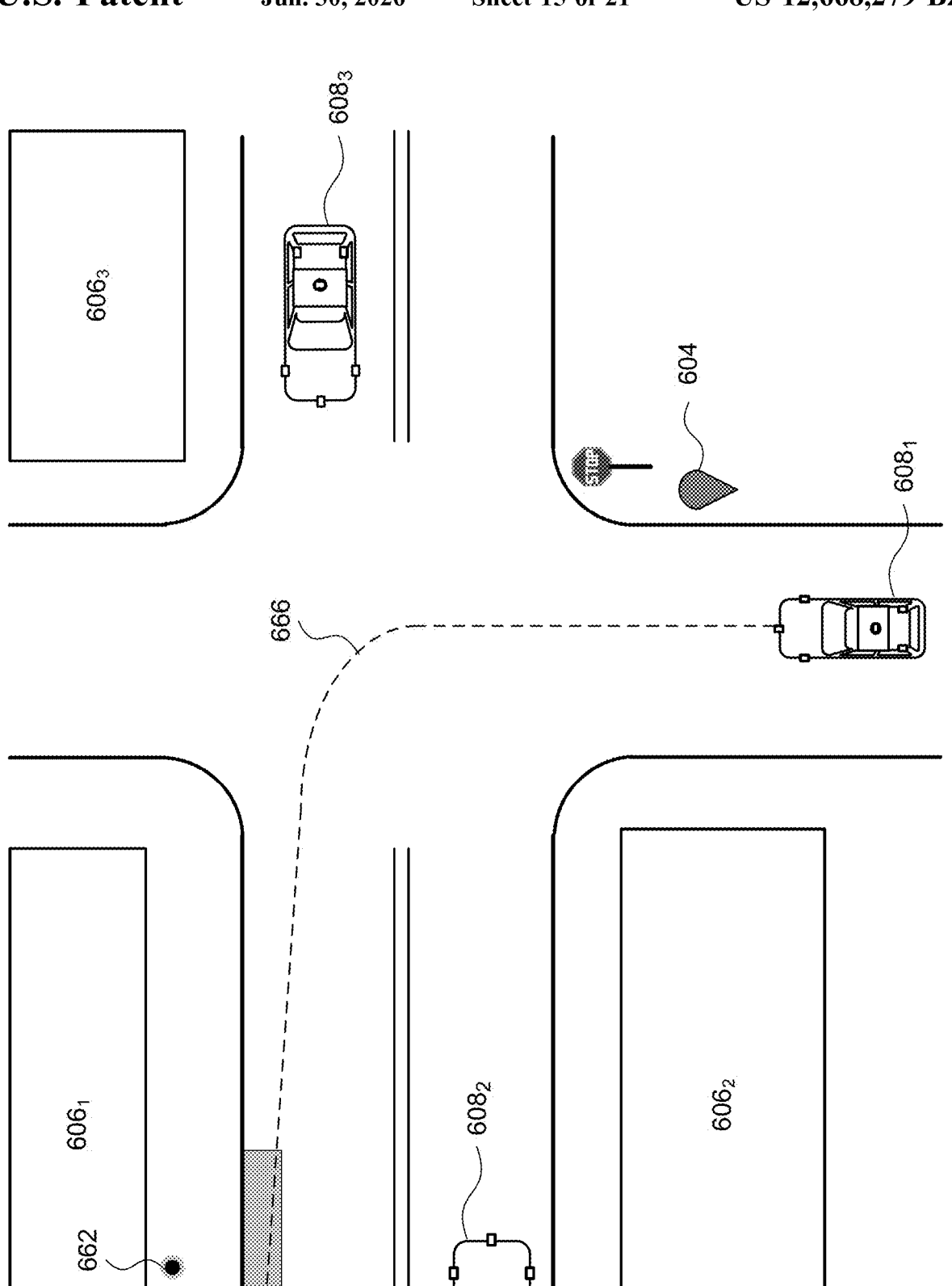

Turning to view 660 of FIG. 6D, using the approach described above, the client device can determine a highly accurate position 662 for itself, and which does not rely on using its GPS receiver. Rather, the position 662 is determined based on localization information associated with one or more nearby autonomous vehicles. Once the position 662 is determined, it can be sent directly to the nearby autonomous vehicles and/or to the back-end system. Thus, an updated pickup location 664 can be identified, which as shown in this example may be much closer to the pedestrian's current position. This updated pickup location 664 may be presented to the pedestrian, such as via a user interface of the client device. Upon selection of the updated pickup location 664, the autonomous vehicle selected for the trip (e.g., 608$_1$ in this example) may adjust its route 666 and/or pullover location 668 using, e.g., its internal routing system and/or planner system.

Note that this system can work when there is at least one vehicle, but can be more effective with more than one vehicle. Here, the larger the number of vehicles, and with the vehicles properly spaced out, the more accurate the user-pose timeline would be. In addition or alternatively, raw GPS measurements would be beneficial from the client device and/or from the vehicle(s) to enhance the localization.

Local Pseudorange Correction Service

Figure 7:
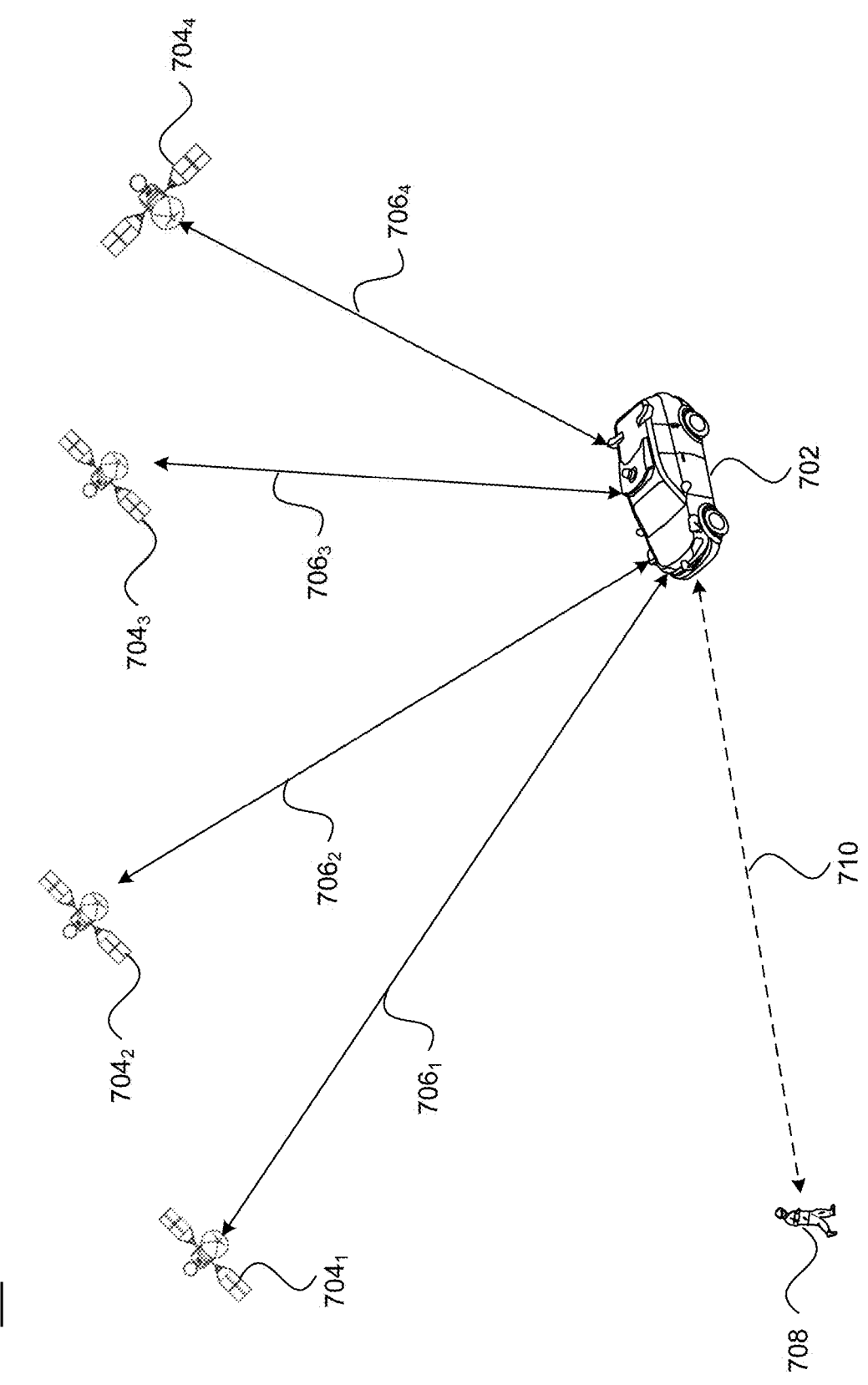
FIG. 7 illustrates a pseudorange correction approach in accordance with aspects of the technology.

In another aspect of the technology, pseudorange correction can be employed to enhance client device accuracy. Each autonomous vehicle is able to determine its instantaneous position as explained above. Given the accuracy of the position is within 1.5 meters or less, the vehicle's processing system (e.g., positioning system 234 of FIG. 2) can compute an error in each pseudorange for each visible satellite (of a global positioning service). FIG. 7 illustrates one example situation 700, in which autonomous vehicle 702 may have four visible satellites 704$_1$, 704$_2$, 704$_3$ and 704$_4$. Here, the vehicle 704 determines a corresponding pseudorange 706$_1$, 706$_2$, 706$_3$ and 706$_4$ to each satellite. Pseudorange calculations are well-known, and are described, by way of example, in "Understanding GPS Principles and Applications", Elliott D. Kaplan, editor, © 1996 (see, e.g., section 2.4), the entire disclosure of which is incorporated by reference herein.

Using the pseudoranges and the actual vehicle location, the vehicle can derive a pseudorange error associated with each visible satellite. This is done by using the known position of the vehicle and the known position of the satellites to compute the actual distance between the vehicle and each satellite. This can be compared to the pseudoranges provided by the receiver to compute the error. Unlike conventional differential GPS (DGPS) methods, here the "base station" is a moving vehicle. Knowing the pseudorange errors, based on the values from one vehicle and any nearby vehicles, the system can apply the same errors as a correction and get a much more accurate position estimate, which may be sub-meter accuracy. The pseudorange errors may be maintained (and updated) in one or more tables stored by each vehicle. The pseudorange error information can be supplied to the user's client device, which can apply corrections to the pseudorange information obtained by the client device for the satellites that are visible to it. Here, the client device may first discard any pseudorange information from the vehicle(s) for satellites not currently visible to the client device. Next, the timestamps of different pseudorange signals from the satellite(s) can be compared to those from the client device, in order to find those within a selected time window (e.g., timestamps within X milliseconds or seconds of one another). Then the pseudorange error information can be applied in a correction to the GPS information received by the client device, such as via a ray tracing approach. Once the correction is applied, which is a correction on the range to each satellite, the corrected GPS location information of the client device may be shared with the autonomous vehicle(s) and/or back-end system, for instance to help identify an alternative pickup location and/or to aid the vehicle with its trip or pullover planning as discussed above.

Note that this approach may only be beneficial for a client device that is sufficiently close to the vehicle(s) such as within a distance of a kilometer or less; otherwise, the pseudorange error information from the vehicles may not provide any meaningful benefit. Thus, before sending the pseudorange error information to the client device of pedestrian 708, the vehicle 702 may determine a relative distance 710 to the pedestrian 708. This can be done via time-of-flight information from Bluetooth, Bluetooth LE and/or UWB signals, as discussed above.

Example System Architecture

Figure 8A:
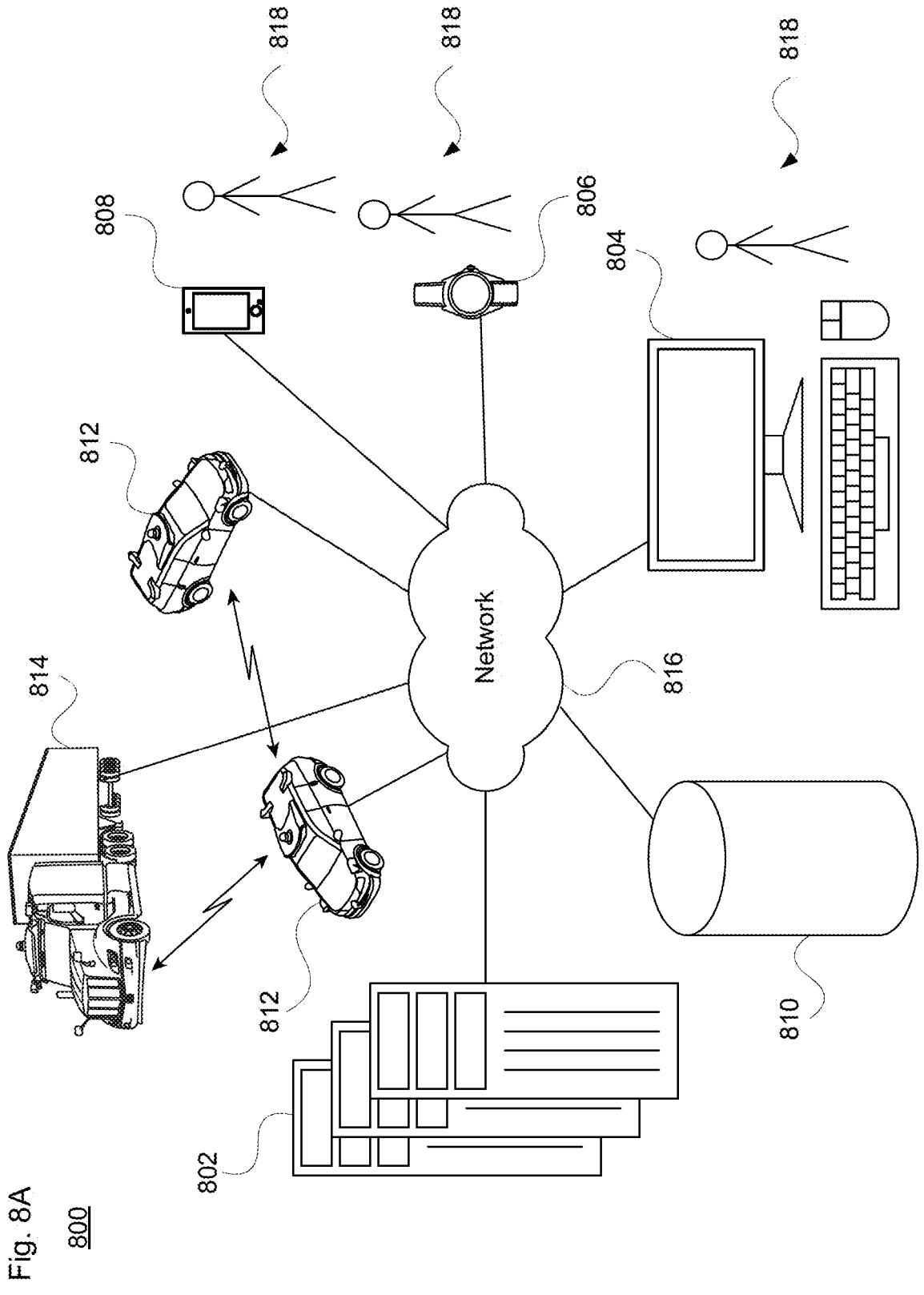
FIGS. 8A-B illustrate an example system in accordance with aspects of the technology.
Figure 8B:
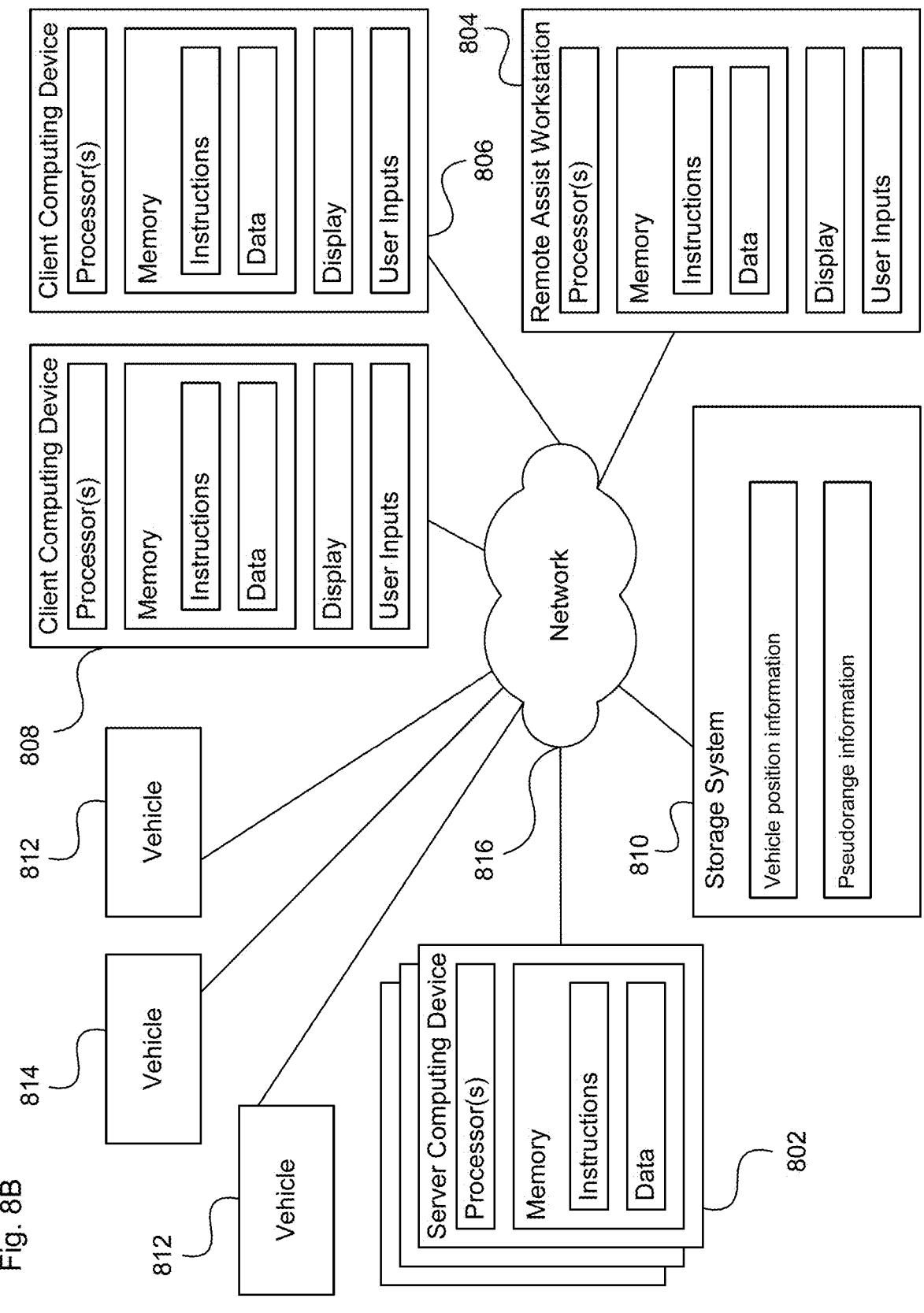

One example of a back-end system for fleet-type operation is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100, 120, 140 and/or 160 of FIGS. 1A-E. Vehicles 812 and/or vehicles 814 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles. As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 816. The network 816 and any intervening nodes may include various configurations and protocols including short range communication protocols such as Bluetooth™, Bluetooth LE™ and UWB, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of autonomous vehicles that can be dispatched by a server computing device to various locations. In this regard, the computing device 802 may function as a dispatching server computing system which can be used to dispatch vehicles to different locations in order to pick up and drop off passengers or to pick up and deliver cargo or other items. In addition, server computing device 802 may use network 816 to transmit and present information to a rider or other user of one of the other computing devices. In this regard, computing devices 804, 806 and 808 may be considered client computing devices.

As shown in FIGS. 8A-B each client computing device 804, 806 and 808 may be a personal computing device intended for use by a respective user 818, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch or HMD), or a netbook that is capable of obtaining information via the Internet or other networks.

In some examples, client computing device 804 may be a remote assistance or other fleet management workstation used by an administrator, rider support operator or other personnel to communicate with riders of dispatched vehicles. Although only a single remote assistance workstation 804 is shown in FIGS. 8A-B, any number of such workstations may be included in a given system. Moreover, although client computing device 804 (such as a remote assistance workstation) is depicted as a desktop-type computer, such devices may include various types of personal computing devices such as laptops, netbooks, tablet computers, etc. By way of example, the remote assistance workstation may be used by a technician or other user to help guide a rider to the vehicle at the pickup location.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. This can include current vehicle position information for the vehicles in the fleet, pseudorange information (e.g., error-related information) gathered by the vehicles' GPS receivers, etc. The storage system 810 may also store autonomous vehicle control software which is to be used by vehicles, such as vehicles 812 or 814, to operate such vehicles in an autonomous driving mode. The storage system 810 can also include route information, weather information, etc. This information may be shared with the vehicles 812 and 814, for instance to help with operating the vehicles in an autonomous driving mode.

FIG. 9A illustrates a method 900, where at block 902 the method includes obtaining, by one or more processors, positioning for one or more vehicles at a point in time. A given one of the one or more vehicles is assigned to pick up a user at a selected pickup location. At block 904, the method includes obtaining, by the one or more processors, a distance between each of the one or more vehicles and a client device of the user for the point in time. Then at block 906, the method includes determining, by the one or more processors, a localized position of the client device based on the positioning for the one or more vehicles and the distance between each of the one or more vehicles and the client device. At block 908 the method includes obtaining, by the one or more processors based on the localized position of the client device, an updated pickup location that differs from the selected pickup location. And at block 910 the method includes causing the given vehicle to drive to the updated pickup location in an autonomous driving mode.

FIG. 9B illustrates a method 920 that includes, at block 922, determining, by one or more processors, a current position of a vehicle configured to operate in an autonomous driving mode. At block 924 the method includes identifying, by the one or more processors, visibility at the current position with a set of satellites of a global positioning service, and at block 926 determining, by the one or more processors, a set of pseudorange errors that includes a pseudorange error for each visible satellite of the set of satellites. At block 928 the method includes transmitting the set of pseudorange errors to a client device of a user to be picked up by the vehicle. At block 930 the method includes receiving, from the client device, a corrected location of the client device based upon a geolocation correction according to the set of pseudoranges. At block 932 the method includes identifying, by the one or more processors, an alternative pickup location for the user based on the corrected location of the client device. And at block 934, the method includes causing the vehicle to drive toward the alternative pickup location in the autonomous driving mode.

FIG. 9C illustrates a method 940, which at block 942 includes receiving from a vehicle configured to operate in an autonomous driving mode, by a client device of a user, a set of pseudorange errors. The set of pseudorange errors includes a pseudorange error for each satellite of a set of satellites of a global positioning service that is visible to the vehicle at a point in time. At block 944 the method includes identifying, by one or more processors of the client device, visibility with the set of satellites. At block 946 the method includes receiving, by the one or more processors, pseudorange information for each visible satellite. And at block 948 the method includes applying, by one or more processors, corrections to the pseudorange information according to the set of pseudorange errors to obtain a corrected location of the client device.

Finally, the technology provides enhanced ability to localize a user's position via several techniques. Using highly accurate information obtained by one or more autonomous vehicles, the client device can identify the user's position. In turn, this can be used in various ways by the system, such as to suggest more suitable pickup locations, enable the vehicle to modify its route or pullover location, avoid vehicle delays by waiting at unsuitable locations, etc. The localization can be done on an as-needed basis, when the client device is close enough to the vehicle(s) to make effective use of the vehicle-generated information. This can avoid wasting processing, transceiver and memory resources of the client device, which can extend operating time.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method, comprising:
   determining, by one or more processors, that a first type of signal from a client device of a user is detected by a vehicle assigned to pick up the user at a selected pickup location;
   responsive to determining that the first type of signal is detected by the vehicle, issuing, by the one or more processors to the client device, a request to transmit a second type of signal that is different from the first type of signal;
   obtaining, by the one or more processors, a location for the vehicle at a point in time;
   obtaining, by the one or more processors using the second type of signal transmitted by the client device, a distance between the vehicle and the client device at the point in time;
   determining, by the one or more processors, a position of the client device based on the location for the vehicle and the distance between the vehicle and the client device;
   obtaining, by the one or more processors based on the position of the client device, an updated pickup location that differs from the selected pickup location; and
   causing the vehicle to drive to the updated pickup location in an autonomous driving mode.

2. The method of claim 1, further comprising:
   determining, using the first type of signal, when the client device is within a threshold distance of the vehicle; and
   only responsive to determining that the client device is within the threshold distance, obtaining the location for the vehicle and the distance between the vehicle and the client device.

3. The method of claim 1, further comprising:
   obtaining an updated location for the vehicle at another point in time; and
   obtaining an updated distance between the vehicle and the client device at the other point in time;
   wherein determining the position of the client device is further based on the updated location and the updated distance.

4. The method of claim 1, wherein the vehicle is a first vehicle of a fleet of vehicle, and the method further comprises:
   obtaining, by one or more processors, a location for a second vehicle of the fleet of vehicles at the point in time; and
   obtaining, by the one or more processors, a distance between the second vehicle and the client device at the point in time,
   wherein determining the position includes performing triangulation according to the location for the first vehicle, the location for the second vehicle, the distance between the first vehicle and the client device, and the distance between the second vehicle and the client device.

5. The method of claim 1, wherein obtaining the location for the vehicle includes:
   determining an estimated location for the vehicle according to one or more localization inputs; and
   applying a set of sensor information obtained from a set of vehicle sensors as a correction to the estimated location for the vehicle.

6. The method of claim 5, wherein the one or more localization inputs includes global positioning information.

7. The method of claim 5, wherein the one or more localization inputs includes lidar sensor information matched to a set of map features.

8. The method of claim 7, wherein the set of sensor information includes vehicle inertial information.

9. The method of claim 8, wherein applying the set of sensor information as the correction includes performing an interpolation between matches of the lidar sensor information and the set of map features.

10. The method of claim 1, further comprising differentiating the vehicle from at least one other vehicle positioned at the updated pickup location.

11. The method of claim 1, wherein the one or more processors are processors of the vehicle.

12. The method of claim 1, wherein the one or more processors are processors of a computing device remote from the client device and the vehicle.

13. The method of claim 1, wherein:
   the first type of signal has a first accuracy, and
   the second type of signal has a second accuracy that is greater than the first accuracy.

14. The method of claim 13, wherein the second accuracy is at least an order of magnitude greater than the first accuracy.

15. A method, comprising:
   determining, by one or more processors of a vehicle configured to operate in an autonomous driving mode, a current position of the vehicle;
   identifying, by the one or more processors, visibility at the current position with a set of satellites of a global positioning service;
   determining, by the one or more processors, a set of pseudorange errors that includes a pseudorange error for each visible satellite of the set of satellites;

providing, by the one or more processors to a client device of a user, the set of pseudorange errors, wherein the user is to be picked up by the vehicle;

receiving, by the one or more processors from the client device, a corrected location of the client device based upon a geolocation correction according to the set of pseudorange errors;

identifying, by the one or more processors, an alternative pickup location for the user based on the corrected location of the client device; and causing, by the one or more processors, the vehicle to drive toward the alternative pickup location in the autonomous driving mode.

16. The method of claim 15, further comprising storing, by the one or more processors, the set of pseudorange errors in memory of the vehicle.

17. The method of claim 15, further comprising updating, by the one or more processors, the set of pseudorange errors as the vehicle travels to pick up the user.

18. A method, comprising:

receiving from one or more first processors of a vehicle configured to operate in an autonomous driving mode, by one or more second processors of a client device of a user, a set of pseudorange errors including a pseudorange error for each satellite of a set of satellites of a global positioning service that is visible to the vehicle at a point in time, the set of pseudorange errors being determined by the one or more first processors;

identifying, by the one or more second processors, visibility with the set of satellites;

receiving, by the one or more second processors, pseudorange information for each visible satellite;

determining, by the one or more second processors based on corrections to the pseudorange information according to the set of pseudorange errors, a corrected location of the client device;

providing, by the one or more second processors, the corrected location of the client device to the one or more first processors;

receiving, by the one or more second processors from the one or more first processors, an update to a pickup location; and generating, by the one or more second processors for presentation to the user, an indication of the update to the pickup location.

19. The method of claim 18, wherein determining the corrected location includes:

discarding any pseudorange errors from the set of pseudorange errors for any satellites not currently visible to the client device.

20. The method of claim 18, wherein determining the corrected location includes:

comparing timestamps of the set of pseudorange errors with timestamps of the received pseudorange information to match timestamps occurring within a selected time window; and applying the corrections according to any matched timestamps.

* * * * *